US008995710B2

(12) United States Patent
Kotake et al.

(10) Patent No.: US 8,995,710 B2
(45) Date of Patent: Mar. 31, 2015

(54) INFORMATION PROCESSING APPARATUS, PROCESSING METHOD THEREOF, AND COMPUTER-READABLE STORAGE MEDIUM

(71) Applicant: Canon Kabushiki Kaisha, Tokyo (JP)

(72) Inventors: Daisuke Kotake, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/873,534

(22) Filed: Apr. 30, 2013

(65) Prior Publication Data

US 2013/0236062 A1    Sep. 12, 2013

Related U.S. Application Data

(63) Continuation of application No. 12/627,279, filed on Nov. 30, 2009, now Pat. No. 8,483,424.

(30) Foreign Application Priority Data

Dec. 3, 2008   (JP) ................................. 2008-308996

(51) Int. Cl.
    G06K 9/00    (2006.01)
    G06T 7/00    (2006.01)

(52) U.S. Cl.
    CPC ............. *G06T 7/0079* (2013.01); *G06T 7/0046* (2013.01); *G06T 2207/30244* (2013.01)
    USPC .......................................... 382/100; 382/103

(58) Field of Classification Search
    USPC ................... 382/100, 154, 266, 291, 294
    See application file for complete search history.

(56) References Cited

U.S. PATENT DOCUMENTS

| 5,850,469 A | 12/1998 | Martin et al. |
| 6,792,370 B2 | 9/2004 | Satoh et al. |
| 6,993,450 B2 | 1/2006 | Takemoto et al. |
| 7,092,109 B2 | 8/2006 | Satoh et al. |

(Continued)

FOREIGN PATENT DOCUMENTS

| JP | 10-162147 A | 6/1998 |
| JP | 2002-008012 A | 1/2002 |

(Continued)

OTHER PUBLICATIONS

Kato, et al., "An Augmented Reality System and its Calibration based on Marker Tracking", The Journal of the Virtual Reality Society of Japan, vol. 4, No. 4, pp. 607-617, (1999).

(Continued)

*Primary Examiner* — Shefali Goradia
(74) *Attorney, Agent, or Firm* — Fitzpatrick, Cella, Harper & Scinto

(57) ABSTRACT

An information processing apparatus that calculates information on a position and an orientation of an image capture device relative to an object captured by the image capture device, holds three-dimensional information including a plurality of line segments that constitute the object, acquires an image of the object captured by the image capture device, detects an image feature indicating a line segment from the acquired image, calculates a position and orientation of the image capture device based on correspondence between the image feature indicating the detected line segment and the held line segment, and determines, for each of the held line segments, whether to use the line segment for the calculation of the position and orientation thereafter, based on at least one of a result of detection of the image feature, and information acquired in the calculation of the position and orientation.

17 Claims, 13 Drawing Sheets

(56) References Cited

U.S. PATENT DOCUMENTS

| | | |
|---|---|---|
| 8,059,889 B2 | 11/2011 | Kobayashi et al. |
| 8,144,238 B2 | 3/2012 | Kotake et al. |
| 2003/0012410 A1 | 1/2003 | Navab et al. |
| 2005/0069196 A1 | 3/2005 | Uchiyama et al. |
| 2005/0234333 A1 | 10/2005 | Takemoto et al. |
| 2006/0227211 A1 | 10/2006 | Kotake et al. |
| 2007/0092161 A1 | 4/2007 | Aratani et al. |
| 2007/0242899 A1 | 10/2007 | Satoh et al. |
| 2009/0262113 A1 | 10/2009 | Kotake et al. |

FOREIGN PATENT DOCUMENTS

| | | |
|---|---|---|
| JP | 2005-069757 A | 3/2005 |
| JP | 2008-046750 A | 2/2008 |
| JP | 2008-286756 A | 11/2008 |

OTHER PUBLICATIONS

T. Drummond et al., "Real-time visual tracking of complex structures", IEEE Transactions on Pattern Analysis and Machine Intelligence, vol. 24, No. 7, pp. 932-946, (2002).

Comport, et al., "A real-time tracker for markerless augmented reality", Proc. The 2nd IEEE/ACM International Symposium on Mixed and Augmented Reality (ISMAR03), pp. 36-45, (2003).

Vacchetti, et al., "Combining edge and texture information for real-time accurate 3D camera tracking", Proc. The 3rd IEEE/ACM International Symposium on Mixed and Augmented Reality (ISMAR04), pp. 48-57, (2004).

C.J. Taylor et al., "Structure and motion from line segments in multiple images", IEEE Transactions on Pattern Analysis and Machine Intelligence, vol. 17, No. 11, pp. 1021-1032, (1995).

J. Canny, "A computational approach to edge detection", IEEE Transactions on Pattern Analysis and Machine Intelligence, vol. 8, No. 6, pp. 679-698j, (1986).

R.Y. Tsai, "A versatile camera calibration technique for high-accuracy 3D machine vision metrology using off-the-shelf TV camera and lenses", IEEE Journal of Robotics and Automation, vol. 3, No. 4, pp. 323-344, (1987).

Wuest, et al., "Adaptive line tracking with multiple hypotheses for augmented reality", Proc. The Fourth Int'l Symp. on Mixed and Augmented Reality (ISMAR05), pp. 62-69, (2005).

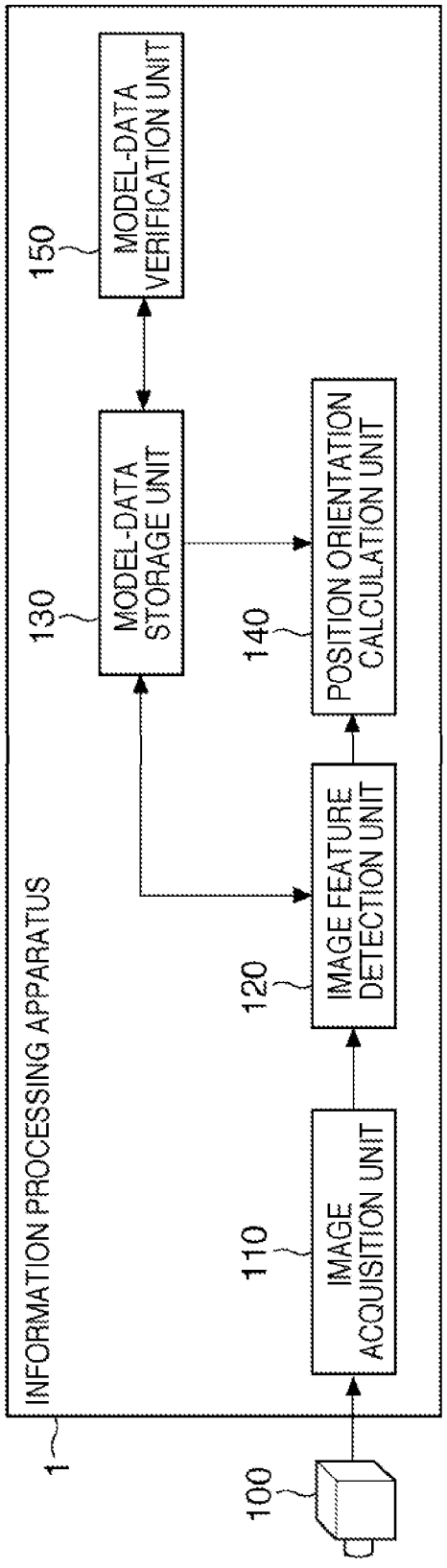
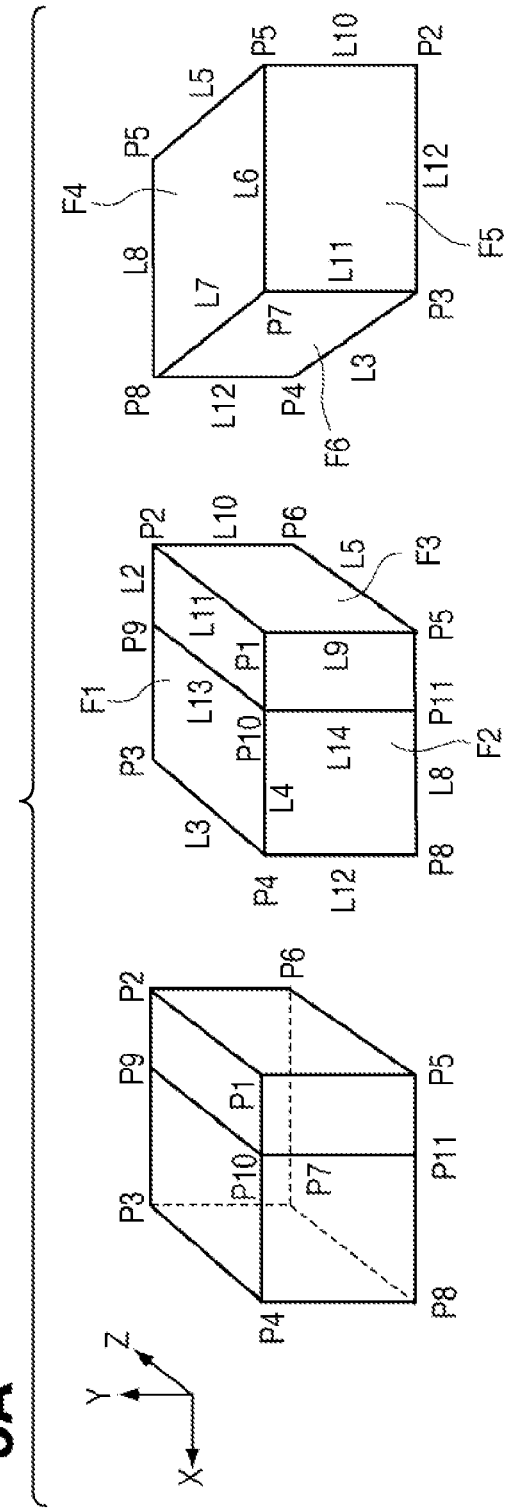

F I G. 3B

| POINT | X | Y | Z |
|---|---|---|---|
| P1 | 0 | 200 | 0 |
| P2 | 0 | 200 | 250 |
| P3 | 250 | 200 | 250 |
| P4 | 250 | 200 | 0 |
| P5 | 0 | 0 | 0 |
| P6 | 0 | 0 | 250 |
| P7 | 250 | 0 | 250 |
| P8 | 250 | 0 | 0 |
| P9 | 100 | 200 | 0 |
| P10 | 100 | 200 | 0 |
| P11 | 100 | 0 | 0 |

F I G. 3C

| PLANE | CONSTITUENT POINTS AND ORDER |
|---|---|
| F1 | P1-P2-P3-P4 |
| F2 | P1-P4-P8-P5 |
| F3 | P1-P2-P6-P5 |
| F4 | P5-P6-P7-P8 |
| F5 | P2-P3-P7-P6 |
| F6 | P3-P4-P8-P7 |

F I G. 3D

| LINE | TWO POINTS OF BOTH ENDS | FLAG Fu |
|---|---|---|
| L1 | P1-P2 | TRUE |
| L2 | P2-P3 | TRUE |
| L3 | P3-P4 | TRUE |
| L4 | P4-P1 | TRUE |
| L5 | P5-P6 | TRUE |
| L6 | P6-P7 | TRUE |
| L7 | P7-P8 | TRUE |
| L8 | P8-P5 | TRUE |
| L9 | P1-P5 | TRUE |
| L10 | P2-P6 | TRUE |
| L11 | P3-P7 | TRUE |
| L12 | P4-P8 | TRUE |
| L13 | P9-P10 | FALSE |
| L14 | P10-P11 | FALSE |

● DIVIDING POINT

INFORMATION PROCESSING APPARATUS, PROCESSING METHOD THEREOF, AND COMPUTER-READABLE STORAGE MEDIUM

This application is a continuation of application Ser. No. 12/627,279 filed Nov. 30, 2009.

BACKGROUND OF THE INVENTION

1. Field of the Invention

The present invention relates to an information processing apparatus that calculates information on the position and orientation of an image capture device relative to an object captured by the image capture device, a processing method thereof, and a computer-readable storage medium.

2. Description of the Related Art

In recent years, research on AR (Augmented Reality) technology for superimposing information regarding virtual space on the real space and displaying the result has been actively conducted. As a typical information presenting device that has adopted such AR technology, a video see-through-type head-mounted display is known, for example. A camera that captures real space is provided in the video see-through-type head-mounted display. With the video see-through-type head-mounted display, a virtual object is drawn using CG (Computer Graphics) according to the position and orientation of the camera or the like. Then, the combined image obtained by superimposing the drawn virtual object on the image of real space is displayed on a display device of the head-mounted display, such as a liquid crystal panel. Thereby, a user can feel as if the virtual object exists in real space.

One of the big problems to be solved when realizing such AR technology is "alignment". Alignment in AR makes geometric matches between a virtual object and real space. In order that the user feels as if a virtual object exists in real space, alignment needs be correctly performed so that the virtual object always exists in the position where the object is to exist in real space, and such a state needs be presented to the user.

With AR using the video see-through-type head-mounted display, generally, every time an image is inputted from the camera provided in the head-mounted display, the position and orientation of the camera in real space when capturing an image are measured. Then, an object is drawn using CG based on the position and orientation of this camera and parameters intrinsic to the camera such as a focal length, and is superimposed on the image of real space. Therefore, when performing alignment in AR, the position and orientation of the camera provided in the head-mounted display need to be correctly measured. Generally, the position and orientation of a camera are measured using a physical sensor with six degrees of freedom that can measure the position and orientation of a camera, such as a magnetic sensor, an ultrasonic sensor, and an optical sensor.

On the other hand, the video see-through-type head-mounted display can use image information from the camera provided therein for alignment. If alignment is performed using image information, such alignment can be more easily performed at a lower cost, compared with an alignment method using a physical sensor. Generally, with this alignment method, an index whose three-dimensional position is known in real space is captured with a camera, and based on the correspondence between the position of the index on the captured image and a three-dimensional position, the position and orientation of the camera are calculated. For an index, for example, a marker artificially disposed in real space, or natural features that originally exist in real space, such as a corner point or an edge, are used. Practically, in terms of stability or the calculation load, artificial markers that are easily detected and identified from image information are widely used.

Relating to such technology, "An Augmented Reality System and its Calibration based on Marker Tracking" (Kato, M. Billinghurst, Asano, and Tachibana, the Journal of the Virtual Reality Society of Japan paper magazine, Vol. 4, No. 4, pp. 607-617, 1999) (hereinafter, referred to as Document 1) discloses a method for performing alignment using a marker having a square shape with an intrinsic two-dimensional pattern drawn inside, for an index. Artificial markers, such as the above square marker, can be easily used and are thus widely used. However, in a case in which it is physically impossible or difficult to dispose a marker, or in a case in which a marker is not preferably disposed for the reason that a fine view is spoiled, or the like, a marker cannot be used.

On the other hand, as the capabilities of computers have improved in recent years, research on technology for performing alignment using a natural feature that originally exists in an actual scene has been actively conducted. Such natural features used for alignment include a feature having a point shape, such as a corner point (hereinafter, a point feature), and a line feature such as an edge. A method for alignment using an edge is disclosed in "Real-time visual tracking of complex structures" (T. Drummond and R. Cipolla, IEEE Transactions on Pattern Analysis and Machine Intelligence, Vol. 24, No. 7, pp. 932-946, 2002) (hereinafter, referred to as Document 2), "A real-time tracker for markerless augmented reality" (A. I. Comport, E. Marchand, and F. Chaumette, Proc. The 2nd IEEE/ACM International Symposium on Mixed and Augmented Reality (ISMAR03), pp. 36-45, 2003) (hereinafter, referred to as Document 3) and "Combining edge and texture information for real-time accurate 3D camera tracking" (L. Vacchetti, V. Lepetit, and P. Fua, Proc. The 3rd IEEE/ACM International Symposium on Mixed and Augmented Reality (ISMAR04), pp. 48-57, 2004) (hereinafter, referred to as Document 4). Since edges do not change with respect to scale or an observation direction, alignment using an edge has the feature that accuracy is high. For alignment using an edge, having three-dimensional model data of real space or a real object drawn using a set of line segments is a premise. Alignment using edges disclosed in Documents 2, 3, and 4 is realized through the following processes (1) to (4). (1) Based on the position and orientation of a camera for a previous frame and the intrinsic parameters of a camera that have been corrected in advance, the three-dimensional model data described above (line segment model) is projected on an image. (2) Each projected line segment is divided at constant intervals on the image, and dividing points are set. Then, for each dividing point, an edge is searched for on the line segment that passes through a dividing point and whose direction is a normal direction of the projected line segment (a search line), and a point whose luminance value has the maximum gradient on the search line and that is nearest to the dividing point is detected as a corresponding edge. (3) A correction value of the position and orientation of a camera is calculated such that the total distance on an image between a corresponding edge detected for each dividing point, and a projected line segment is the minimum, and the position and orientation of a camera are calculated, based on that correction value. (4) Repeat the process in (3) until the calculated result converges, and optimizing calculation is performed.

Unlike the point feature, an edge is less identifiable on an image. When searching for an edge, since only information regarding the maximum gradient of the luminance value on a search line is used, an incorrect edge is often detected. Accordingly, in Documents 2, 3, and 4, in order to prevent an edge incorrectly detected from having a harmful effect on the optimizing calculation, using the technique called M-estimation, the weight of the data of an edge considered to have been incorrectly detected is reduced, and then an optimizing calculation is performed.

Further, as described above, alignment using an edge needs three-dimensional model data for line segments that constitute real space and a real object that are to be aligned. Conventionally, measurement of three-dimensional model data of a line segment was manually performed or was performed using an image. A tape measure, a ruler, a protractor, and the like are used for manual measurement. Further, after capturing an image of a scene or an object that is to be measured, photogrammetry software for calculating three-dimensional data based on the result obtained by the person measuring manually designating a line segment on that image is also used, for instance. The person measuring searches, from the real space/real object, for a line segment that is likely to be detected as an edge when performing alignment, such as a line of intersection between a plane and a plane, a line whose luminance greatly changes between each side of a line, and the like, and measures using the above-mentioned tools or software. Further, other than this, as described in "Structure and motion from line segments in multiple images" (C. J. Taylor and D. J. Kriegman, IEEE Transactions on Pattern Analysis and Machine Intelligence, Vol. 17, No. 11, pp. 1021-1032, 1995) (hereinafter, referred to as Document 5), a method for measuring the three-dimensional data of a line segment using an image is also known. In Document 5, based on the correspondence of a line segment on images among a plurality of images, the direction of a straight line and the passing position thereof in three-dimensional space are estimated. In Document 5, as a method for detecting an edge on an actual image, a two-dimensional edge detecting method described in "A computational approach to edge detection" (J. Canny, IEEE Transactions on Pattern Analysis and Machine Intelligence, Vol. 8, No. 6, pp. 679-698, 1986) (hereinafter, referred to as Document 6) is used.

When performing alignment using an edge described above, three-dimensional model data is projected, and an edge is detected through a one-dimensional search based on that projection image. Accordingly, at the point in time of measuring three-dimensional model data, since the three-dimensional model data does not exist, such edge detection through a one-dimensional search based on a projection of three-dimensional model data cannot be performed. In other words, whether or not an edge estimated by the person measuring as being an edge, and an edge detected using a two-dimensional edge detecting method will be detected when performing alignment is not known in advance. This is a common problem with not only the aforementioned edge detecting method for detecting the extremum of a concentration gradient, but also with other methods for projecting three-dimensional model data and performing a one-dimensional search (for example, methods such as that for performing a one-dimensional search for a corresponding edge using information on an image around an edge).

Accordingly, in the case of manual measurement, since the person measuring needs to determine with his/her eyes whether or not an edge is the edge used for alignment, such operations require skill. Furthermore, since there are cases in which even a person skilled in measuring may make a mistake in determination, after measurement of three-dimensional model data, there is a need to actually perform alignment and to repeatedly determine which line segment is unnecessary. Therefore, measurement takes time and effort.

Further, when performing conventional alignment using an edge, even in a case in which information on a line segment that is not actually detected as an edge is included in a three-dimensional model, the edges corresponding to these line segments are to be detected, and correspondence is to be established. For that reason, since incorrect detection of an edge on an image, or incorrect correspondence between such a line segment and the line segment of a model occurs, the accuracy and stability of such alignment decreases.

SUMMARY OF THE INVENTION

The present invention provides technology for reducing the calculation load using three-dimensional information when performing a position and orientation calculation process, and also for suppressing the decrease in the accuracy and stability of alignment.

According to a first aspect of the present invention there is provided an information processing apparatus that calculates information on a position and an orientation of an image capture device relative to an object captured by the image capture device, the information processing apparatus comprising: a holding unit configured to hold three-dimensional information including a plurality of line segments that constitute the object; an acquisition unit configured to acquire an image of the object captured by the image capture device; a detection unit configured to detect an image feature indicating a line segment from the image acquired by the acquisition unit; a calculation unit configured to calculate a position and orientation of the image capture device based on correspondence between the image feature indicating the line segment detected by the detection unit and the line segment held by the holding unit; and a determination unit configured to make a determination, for each of the line segments held by the holding unit, as to whether to use the line segment for the calculation of the position and orientation thereafter, based on at least one of a result of detection of the image feature by the detection unit, and information acquired in the calculation of the position and the orientation by the calculation unit.

According to a second aspect of the present invention there is provided a processing method of an information processing apparatus that calculates information on a position and an orientation of an image capture device relative to an object captured by the image capture device, the method comprising: acquiring an image of the object captured by the image capture device; detecting an image feature indicating a line segment from the image acquired in the acquisition step; calculating a position and orientation of the image capture device based on correspondence between the image feature indicating the line segment detected in the detection step and a plurality of line segments, in three-dimensional information, that constitute the object held by a holding unit; and making a determination, for each of the line segments held by the holding unit, as to whether to use the line segment for the calculation of the position and orientation thereafter, based on at least one of a result of detection of the image feature in the detection step, and information acquired in the calculation of the position and orientation in the calculation step.

According to a third aspect of the present invention there is provided a computer-readable storage medium storing a computer program that causes a computer provided in an information processing apparatus that calculates information on a position and an orientation of an image capture device relative to an object captured by the image capture device, to function as: a holding unit configured to hold three-dimensional information including a plurality of line segments that constitute the object; an acquisition unit configured to acquire an image of the object captured by the image capture device; a detection unit configured to detect an image feature indicating a line segment from the image acquired by the acquisition unit; a calculation unit configured to calculate a position and orientation of the image capture device based on correspondence between the image feature indicating the line segment detected by the detection unit and the line segment held by the holding unit; and a determination unit configured to make a determination, for each of the line segments held by the holding unit, as to whether to use the line segment for the calculation of the position and orientation thereafter, based on at least one of a result of detection of the image feature by the detection unit, and information acquired in the calculation of the position and the orientation by the calculation unit.

Further features of the present invention will be apparent from the following description of exemplary embodiments with reference to the attached drawings.

BRIEF DESCRIPTION OF THE DRAWINGS

FIG. 2 is a diagram showing an example of the configuration of an information processing apparatus 1 shown in FIG. 1.

FIGS. 3A to 3D are diagrams showing an example method for defining a three-dimensional model according to Embodiment 1.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1:
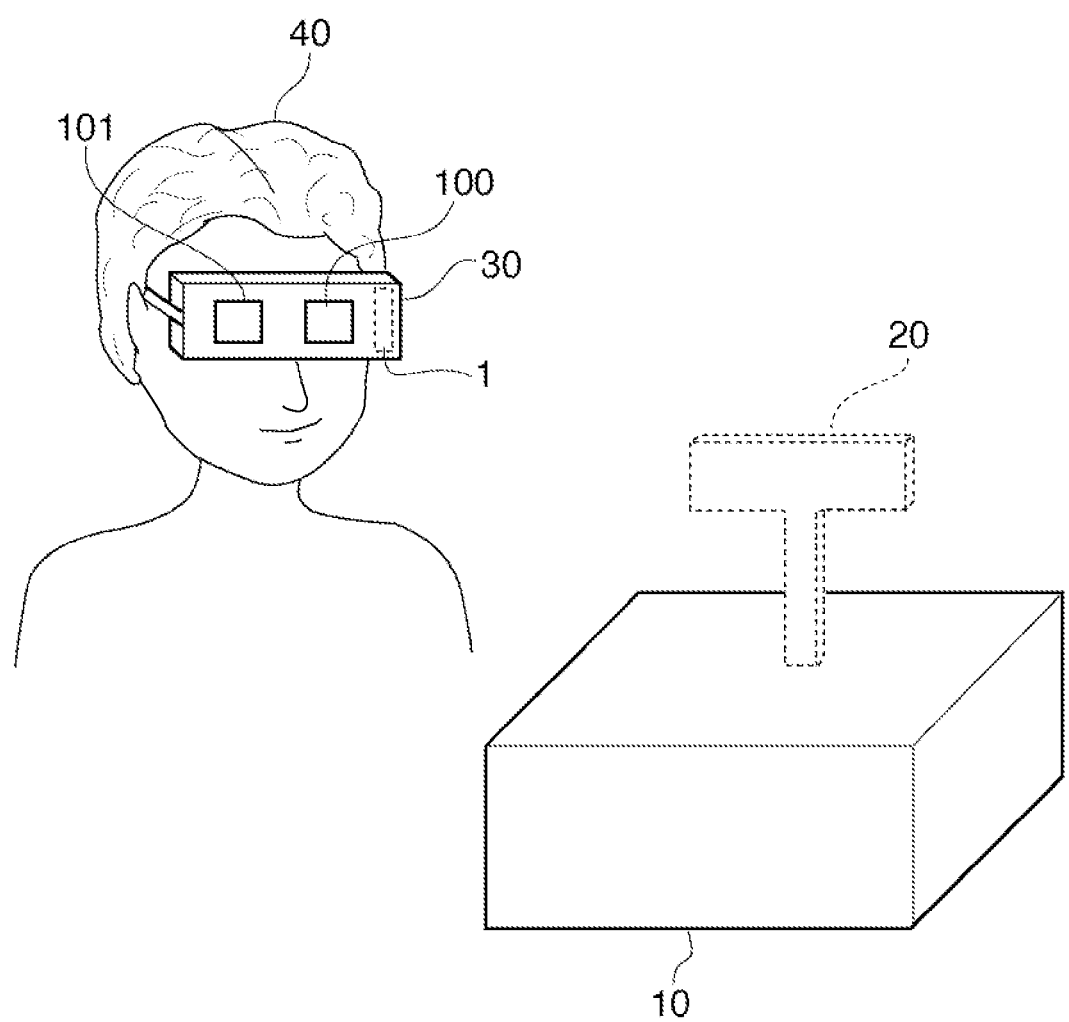
FIG. 1 is a diagram showing a schematic example of a video see-through-type head-mounted display in which an information processing apparatus according to one embodiment of the present invention has been incorporated.

FIG. 1 is a diagram showing a schematic example of a video see-through-type head-mounted display in which an information processing apparatus according to one embodiment of the present invention has been incorporated. Note that although a case in which an information processing apparatus 1 is used for alignment in AR (Augmented Reality) is described as an example in the present embodiment, the information processing apparatus 1 may of course be used for a purpose other than this.

An observer 40 is wearing a video see-through-type head-mounted display 30. The observer 40 observes an observation object 10 via the video see-through-type head-mounted display 30. Thereby, a video on which a virtual object 20 is superimposed on the observation object 10 is displayed to the observer 40. In this case, an annotation for the observation object 10 is displayed as the virtual object 20, for example.

Image capture devices (100, 101) corresponding to the left eye and the right eye, respectively, are provided in the video see-through-type head-mounted display 30. The image capture device 100 captures the observation object 10. The image captured by the image capture device 100 is inputted into the information processing apparatus 1. The information processing apparatus 1 calculates the positions and orientations of the image capture devices (100, 101), based on the image captured by the image capture devices (100, 101), and three-dimensional model data on the observation object 10. Note that it is sufficient to obtain a parameter intrinsic to the camera, such as a focal length of the image capture devices (100, 101), in advance using a known camera calibration method (for example, "A versatile camera calibration technique for high-accuracy 3D machine vision metrology using off-the-shelf TV camera and lenses" (R. Y. Tsai, IEEE Journal of Robotics and Automation, Vol. 3, No. 4, pp. 323-344, 1987) (hereinafter, referred to as Document 7).

The video see-through-type head-mounted display 30 draws an image of the virtual object 20 based on the positions and orientations of the image capture devices (100, 101) calculated by the information processing apparatus 1, and superimposes the drawn image on images of real space captured by each of the image capture devices (100, 101). Thereby, the combined image is displayed on a display device (not shown) of the head-mounted-display 30.

The above is a description of a schematic example of the video see-through-type head-mounted display 30. Note that a computer is incorporated in the information processing apparatus 1 described above. The computer is provided with a main control unit such as a CPU, and a storage unit, such as a ROM (Read Only Memory), a RAM (Random Access Memory), or an HDD (Hard Disk Drive). Further, the computer may also be provided with an input/output unit such as a button, a display, or a touch panel, a communication unit such as a network card, and the like, in addition to the above units. Note that these constituent units are connected by a bus or the like, and are controlled by the main control unit executing a program stored in the storage unit.

Although the information processing apparatus 1 is incorporated in the video see-through-type head-mounted display 30 in FIG. 1, the information processing apparatus 1 may be realized as a separate apparatus outside the apparatus serving as the video see-through-type head-mounted display 30.

Further, in the present embodiment, in order to simplify description, a case in which three-dimensional model data is verified using an image captured by the image capture device 101 is described as an example. Of course, this process may be performed using images captured by both of the image capture device 100 and the image capture device 101.

FIG. 2 is a diagram showing an example of the configuration of the information processing apparatus 1 shown in FIG. 1.

The information processing apparatus 1 is constituted, with an image acquisition unit 110, an image feature detection unit 120, a model-data storage unit 130, a position orientation calculation unit 140, and a model-data verification unit 150 being provided.

The image acquisition unit 110 inputs an image captured by the image capture device 100 into the information processing apparatus 1. The image acquisition unit 110 is realized by an analog video capture board, for example, if the outputs of the image capture device 100 are analog outputs, such as NTSC. Further, the image acquisition unit 110 is realized by an IEEE1394 interface board, for example, if the outputs of an image capture device are digital outputs, such as IEEE1394. Note that acquisition of an image by the image acquisition unit 110 may be performed by reading out the digital data of a still image and a moving image that are stored in advance in a storage device.

The image feature detection unit 120 detects an image feature indicating a line segment in three-dimensional space from the image inputted by the image acquisition unit 110. The image feature indicating a line segment in three-dimensional space is, for example, the point that reaches the extremum of a concentration gradient, or in other words, an edge. The image feature detection unit 120 performs edge detection based on model data constituted from three-dimensional information stored in the model-data storage unit 130 described later, or predicted values of the position and orientation of the image capture device 100.

The model-data storage unit 130 stores three-dimensional model data (that may be abbreviated as a three-dimensional model, hereinafter) of the observation object 10 serving as a reference object for alignment. Here, an example of a method for defining a three-dimensional model according to the present embodiment is described with reference to FIGS. 3A to 3D. A three-dimensional model is defined by information on a plane constituted from a set of points or points being connected, or information on line segments that constitute a plane. As shown by the left diagram in FIG. 3A, a three-dimensional model according to the present embodiment is a rectangular parallelepiped constituted from eight points consisting of a point P1 to a point P8. Here, the X-axis of the coordinate system of the rectangular parallelepiped is set in the direction toward the point P4 from the point P1, the Y-axis of the coordinate system of the rectangular parallelepiped is set in the direction toward the point P1 from the point P5, the Z-axis of the coordinate system of the rectangular parallelepiped is set in the direction toward the point P2 from the point P1 and, furthermore, an origin point is set at the point P5.

As shown by the right diagram and center diagram in FIG. 3A, the rectangular parallelepiped is constituted from planes F1 to F6. Similarly, the rectangular parallelepiped is constituted from line segments L1 to L12. Furthermore, the three-dimensional model according to the present embodiment has a line segment L13 on the plane F1, and has a line segment L14 on the plane F2. The line segment L13 connects a point P9 and a point P10, and the line segment L14 connects the point P10 and a point P11.

As shown in FIG. 3B, the points P1 to P11 are expressed using three-dimensional coordinate values. Also, as shown in FIG. 3C, the planes F1 to F6 are expressed by the IDs (identifiers) of the points that constitute the plane, and the order in which the points are connected. Also, as shown in FIG. 3D, corresponding to each of the line segments L1 to L14, usability flags $F_u$ that show whether or not the information can be used for position and orientation calculation (if the flag shows TRUE, the information can be used) are provided.

Also, model-data verification data is stored in the model-data storage unit 130. Model-data verification data is constituted so as to include frame data $D_1$ and accumulation data $D_S$. $D_1$ and $D_S$ included in the model-data verification data are stored corresponding to each of the line segments that constitute the model data. Frame data $D_1$ stores therein one frame of verification data, and is constituted from the "number of edges that are to be detected $N_{E1}$", and the "number of edges that were actually detected $N_{D1}$". Further, accumulation data $D_S$ is constituted from the "number of pieces of accumulation data $N_S$", the "total number of edges that are to be detected $N_{ES}$", and the "total number of edges that were actually detected $N_{DS}$".

The position orientation calculation unit 140 calculates the position and orientation of the image capture device 100 in the coordinate system on the basis of the observation object 10 (hereinafter, referred to as a reference coordinate system). Note that the position and orientation of the image capture device 100 are calculated based on an edge in the captured image detected by the image feature detection unit 120, and three-dimensional model data stored in the model-data storage unit 130.

The model-data verification unit 150 verifies whether or not to use each line segment that constitutes three-dimensional model data for position and orientation calculation. This verification is performed based on statistical data acquired from the result of edge detection by the image feature detection unit 120.

Further, the information processing apparatus 1 has a model-data verification flag $F_{MD}$. The model-data verification flag $F_{MD}$ is a flag showing whether or not to verify model data. If the flag $F_{MD}$=TRUE, model data is verified and, if the flag $F_{MD}$=FALSE, model data is not verified. The flag $F_{MD}$ is set to FALSE in an initial state.

A user switches the flag $F_{MD}$ using an input unit (not shown), such as a keyboard, a mouse, or the like, for example. If the flag $F_{MD}$ is set to TRUE, accumulation data $D_S$ stored in the model-data storage unit 130 is reset to 0. Further, the number of frames $N_{max}$ indicating how many frames of data are accumulated with respect to the accumulation data is set in advance. In other words, after setting the flag $F_{MD}$ to TRUE, the user decides in advance how many frames of data are accumulated and used for verification of model data. If the number of pieces of accumulation data $N_S$ is equal to $N_{max}$, model data is verified. After the verification of model data ends, the flag $F_{MD}$ is set to FALSE, and all pieces of accumulation data DS are reset to 0.

Next, an example of the flow of processing performed by the information processing apparatus 1 shown in FIG. 1 is described with reference to FIG. 4.

S1010

In S1010, the information processing apparatus 1 performs initialization processing. In initialization processing, predicted values obtained by predicting the position and orientation of the image capture device 100 in the reference coordinate system are set, and a model-data verification flag, a usability flag, and accumulation data are reset.

Here, initialization processing is described in detail. First, the setting of predicted values of the position and orientation of the image capture device 100 is described. In the present embodiment, position and orientation measurement is performed using a method for successively updating the approximate position and orientation of the image capture device using information on a line segment. Therefore, before starting position and orientation measurement, it is necessary to provide the approximate position and orientation of the image capture device in advance. In view of this, for example, the decided position and orientation are set in advance, and the image capture device 100 is moved so as to be in that position and so as to take that orientation. Alternatively, as described in Document 1, an artificial index that can be recognized only through detection in an image may be disposed, the position and orientation of the image capture device may be obtained from the correspondence between the coordinates of each peak of the artificial index, and the three-dimensional position of each peak in the reference coordinate system, and the obtained position and orientation may be used as the approximate position and orientation of the image capture device. Furthermore, a position orientation sensor with six degrees of freedom, such as a magnetic sensor, an optical sensor, or an ultrasonic sensor, may be provided to the image capture device, and the position and orientation acquired from the sensor may be used as the approximate position and orientation of the image capture device. The position and orientation of the image capture device that are measured using an artificial index and the position orientation sensor with six degrees of freedom described above, or using an artificial index, an orientation sensor with three degrees of freedom and a position sensor with three degrees of freedom together, may be used as the approximate position and orientation of the image capture device.

In S1010, the model-data verification flag $F_{MD}$ is set to FALSE. Then, for each line segment stored in the model-data storage unit 130, usability flags F, that show whether or not the information can be used for position and orientation calculation are set to TRUE. Furthermore, all pieces of accumulation data $D_S$ are reset to 0. After this initialization ends, the processing proceeds to a process in S1020.

S1015

In S1015, it is determined whether position and orientation measurement has ended. If the user inputs an instruction to end via the input unit such as a mouse or a keyboard, the result of S1015 is YES, and this processing ends. In other cases, the result of S1015 is NO, and the processing proceeds to a process in S1020.

S1020

In S1020, in the image acquisition unit 110, the information processing apparatus 1 takes an image captured by the image capture device 100 in the apparatus (inside the information processing apparatus 1).

S1030

In S1030, in the image feature detection unit 120, the information processing apparatus 1 detects an edge on an image inputted in S1020. When starting this processing, frame data $N_{E1}$ and $N_{D1}$ for every line segment are set to 0. Note that the details of an edge detection process are described later.

S1040

In S1040, in the position orientation calculation unit 140, the information processing apparatus 1 calculates the position and orientation of the image capture device 100. As described above, this calculation is performed based on the edge on the image detected in S1030, and three-dimensional model data stored in the model-data storage unit 130. Note that the details of a position and orientation calculation process are described later.

S1050

In S1050, in the model-data verification unit 150, the information processing apparatus 1 determines whether or not a verification mode has been entered. This determination is made based on the value of the model-data verification flag $F_{MD}$. Here, if model data is verified ($F_{MD}$=TRUE), the processing proceeds to a process in S1060, and if verification is not to be performed, the processing returns to a process in S1015.

S1060

In S1060, the information processing apparatus 1 starts a model-data verification process. In this process, first, accumulation data $N_{ES}$ and $N_{DS}$ for each line segment that constitutes three-dimensional model data stored in the model-data storage unit 130 are updated. Specifically, frame data $N_{E1}$ and $N_{D1}$ for each line segment updated in S1030 are added to $N_{ES}$ and $N_{DS}$, respectively.

S1070

In S1070, the information processing apparatus 1 increases the number of pieces of accumulation data $N_S$ by one (accumulation data count ++).

S1080

In S1080, the information processing apparatus 1 determines whether or not the number of pieces of accumulation data $N_S$ is equal to the number of pieces of accumulation data $N_{max}$ that has been set in advance. If the numbers are equal, the processing proceeds to a process in S1090, and if the numbers are not equal, the processing returns to a process in S1015, and the next image, or in other words, the image of the next frame, is acquired through a process in S1020.

S1090

In S1090, in the model-data verification unit 150, the information processing apparatus 1 verifies, for each of the line segments that constitute three-dimensional model data, whether or not to use the line segment for the position and orientation calculation. Note that although the details about this process are described later, model data stored in the model-data storage unit 130 is verified based on accumulation data $N_{ES}$ and $N_{DS}$ for every line segment. After this process ends, the processing returns to a process in S1015.

Figure 4:
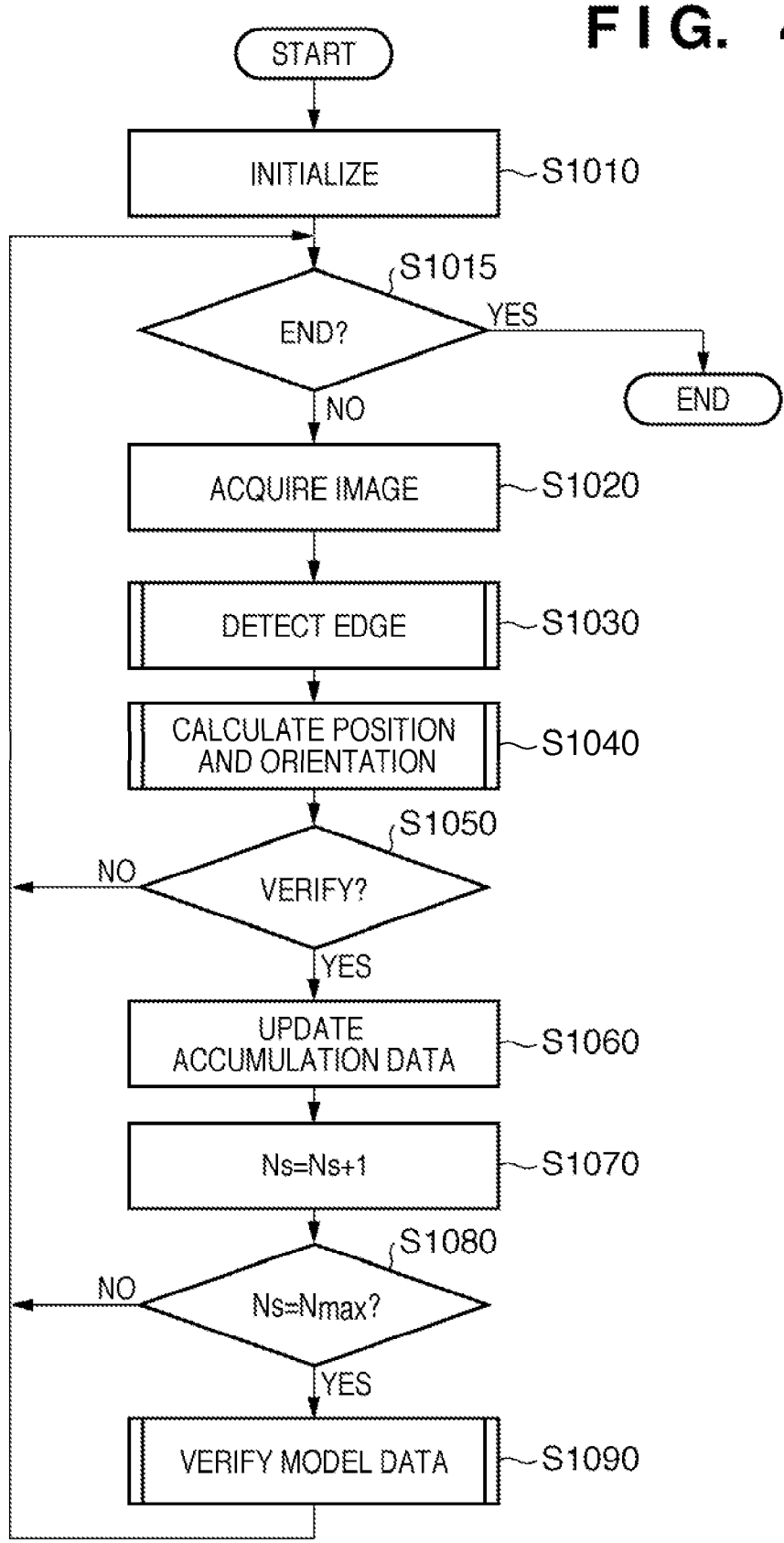
FIG. 4 is a flowchart showing an example of the flow of processing performed by the information processing apparatus 1 shown in FIG. 1.
Figure 5:
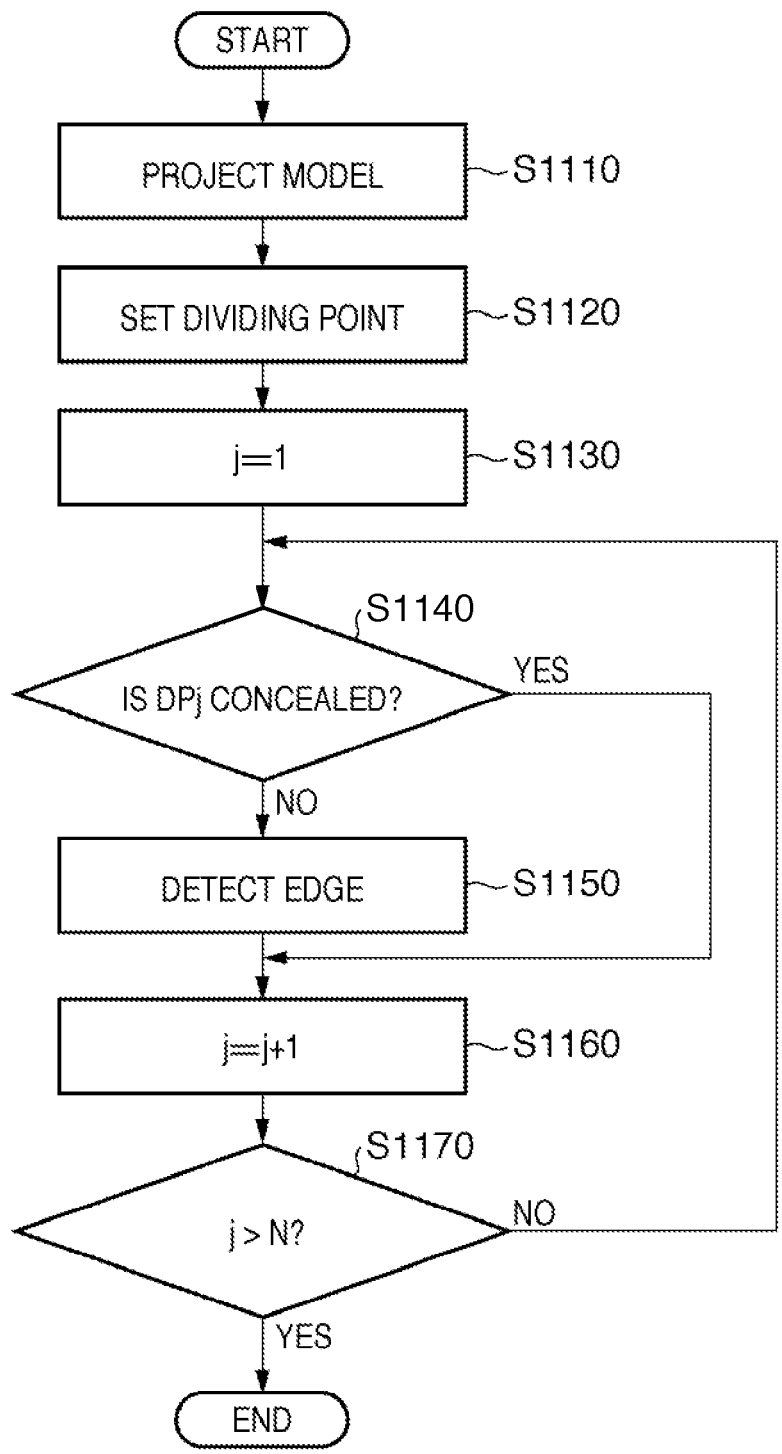
FIG. 5 is a flowchart showing an example of the flow of an edge detection process in S1030 in FIG. 4.

Next, an example of the flow of the edge detection process in S1030 in FIG. 4 is described with reference to FIG. 5.

S1110

First, in S1110, the information processing apparatus 1 performs model projection. Here, model projection is the projecting of three-dimensional model data on an observation object onto an image, based on predicted values of the position and orientation of the image capture device 100. More specifically, model projection obtains an equation of a straight line on the image when each line segment that constitutes three-dimensional model data is projected onto the image. The equation of a straight line is an equation of a straight line obtained by both ends of the line segment being projected on the image, and the coordinates of both ends on the image being connected. For the predicted values of the position and orientation of the image capture device 100, if it is immediately after the initialization in S1010 shown in FIG. 4, the position and orientation of the image capture device 100 that are acquired through that initialization are used. If it is not immediately after the initialization, the position and orientation of the image capture device 100 that were calculated for the previous frame are used. In order to perform model projection, as well as the position and orientation of the image capture device 100, the intrinsic parameters of the camera, such as a focal length and a principal point position, need to be known. As described above, in the present embodiment, the intrinsic parameters of the camera are assumed to be measured in advance and known. Further, model projection and edge detection are not performed on a line segment for which a usability flag $F_u$ indicating whether or not the line segment can be used for position and orientation calculation shows FALSE.

Figure 6A:
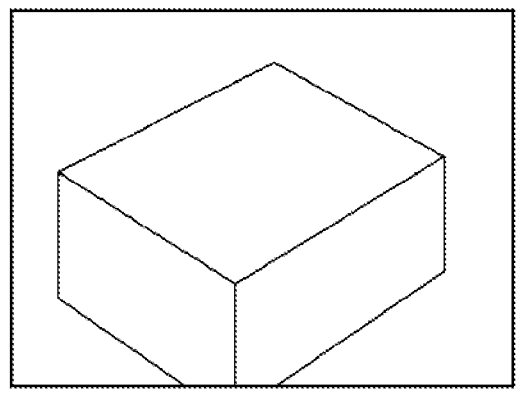
FIGS. 6A and 6B are diagrams showing an example projection of a three-dimensional model on an image.
Figure 6B:
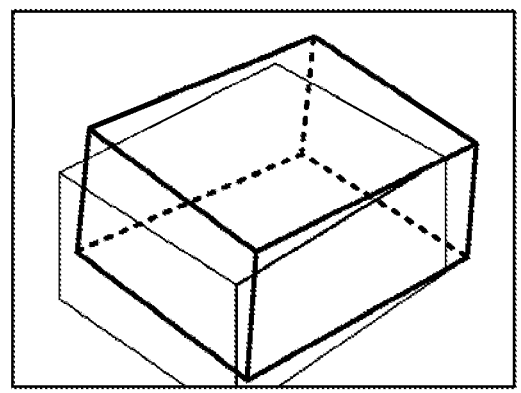

FIGS. 6A and 6B are diagrams showing an example projection of a three-dimensional model onto an image. FIG. 6A shows the captured image itself, and FIG. 6B shows a mode in which the three-dimensional model is projected onto the image. If predicted values of the position and orientation differ from those of the actual position and orientation, as shown in FIG. 6B, a relative gap is generated between the object actually captured and the projected image of the three-dimensional model shown with a thick line. In FIG. 6B, the line segments shown with dashed lines indicate the line segments that are hidden and cannot be actually seen among the line segments that constitute the three-dimensional model.

S1120, S1130

Next, in S1120, the information processing apparatus 1 sets a dividing point with which the projected line segment is divided at an equal interval on the image, using the equation of a straight line calculated in S1110. This dividing point is set for all the line segments that constitute the three-dimensional model data.

Figure 7:
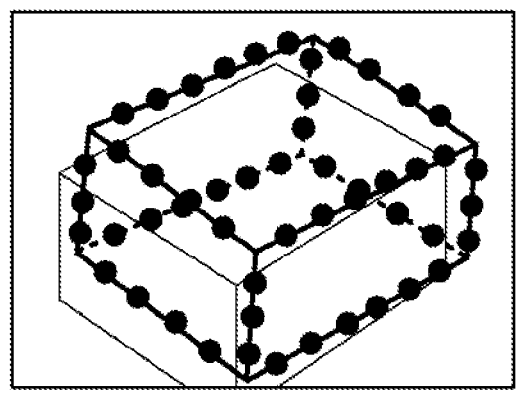
FIG. 7 is a diagram showing example dividing points of a three-dimensional model on an image.

FIG. 7 is a diagram showing example dividing points of the three-dimensional model on the image. Here, the total number of dividing points is assumed to be N and each dividing point is assumed to be DPj (j=1, 2, . . . , N). The number of dividing points N can be controlled by changing the interval between dividing points on an image. Further, the interval between dividing points on an image may be successively altered such that the number of dividing points is constant.

Hereinafter, edge detection is sequentially performed on DPj (j=1, 2, . . . , N). First, j is set to 1 in S1130.

S1140

Next, in S1140, the information processing apparatus 1 determines whether or not the dividing point DPj is concealed. Concealment refers to the state in which the dividing point DPj is hidden by another plane of the three-dimensional model. For example, dividing points DPj on the line segment shown with a dashed line in FIG. 7 are concealed, not visible. As described, for example, in "Adaptive line tracking with multiple hypotheses for augmented reality" (H. Wuest, F. Vial, and D. Stricker, Proc. The Fourth Int'l Symp. on Mixed and Augmented Reality (ISMAR05), pp. 62-69, 2005) (hereinafter, referred to as Document 8), determination of whether or not a dividing point DPj is visible can be performed by drawing the dividing point after drawing a three-dimensional model using graphics hardware, and confirming with the graphics hardware whether or not a depth buffer has been updated. As a result, if a dividing point DPj is concealed, the processing proceeds to a process in S1160, and if it is not concealed, the processing proceeds to a process in S1150 after adding one to the value of the frame data $N_{E1}$ of a corresponding line segment.

S1150

Figure 8:
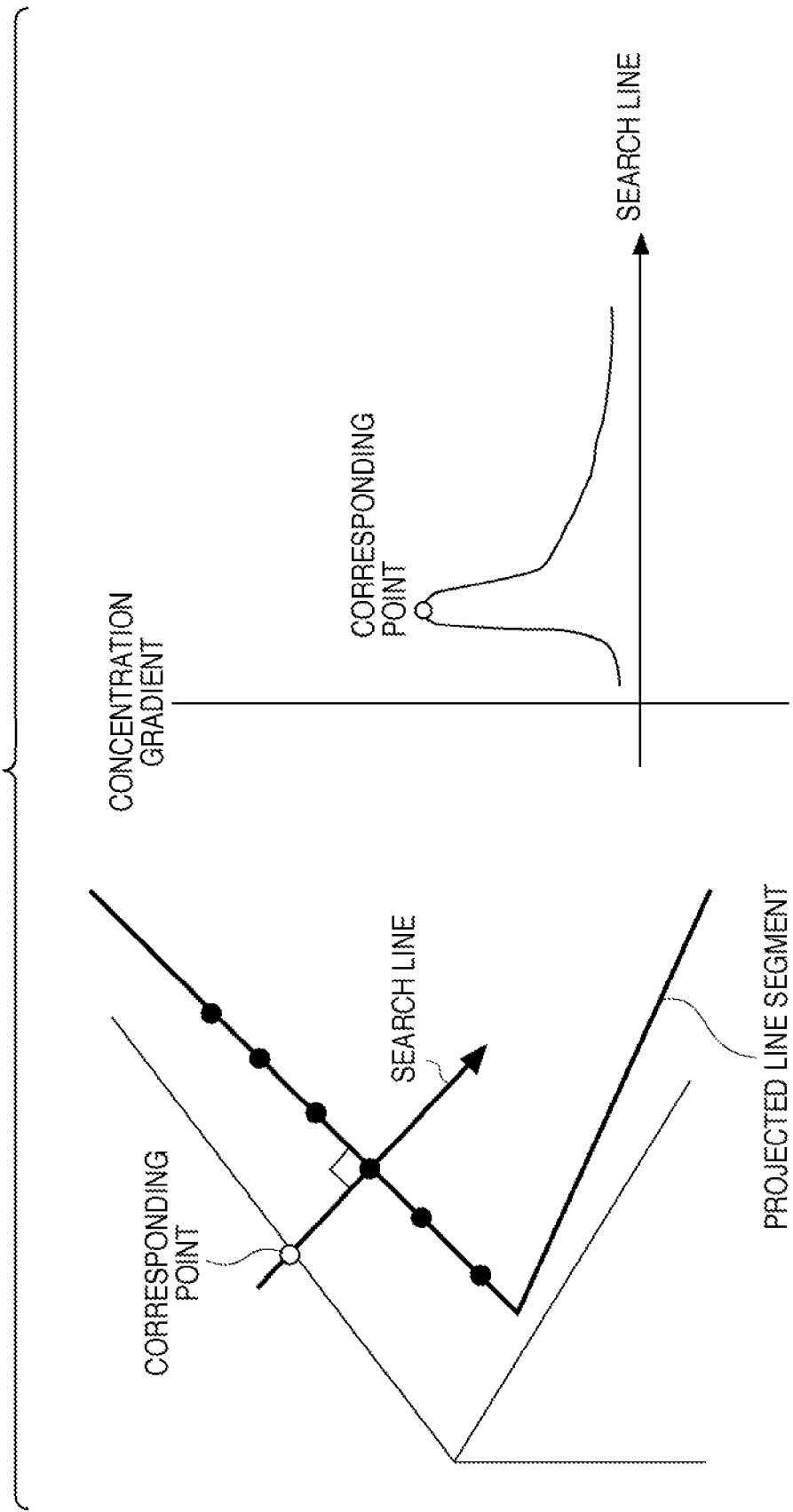
FIG. 8 is a diagram showing a schematic example of a method for detecting an edge according to Embodiment 1.

In S1150, the information processing apparatus 1 detects an edge corresponding to a dividing point DPj. FIG. 8 is a diagram showing a schematic example of a method for detecting an edge according to the present embodiment. As shown in FIG. 8, on a line segment that is parallel to the normal direction of the projected line segment and passes through a dividing point (below, a search line), a one-dimensional search for an edge is performed. An edge exists in the position where a concentration gradient reaches an extremum on the search line. A threshold is provided to the absolute value of the extremum of a concentration gradient, which prevents an edge with a small absolute value of the extremum from being detected. In the present embodiment, if a plurality of edges exist on the search line, the edge nearest to a dividing point is assumed to be a corresponding point, and the image coordinates thereof and the three-dimensional coordinates of the dividing point are held. Note that although the edge nearest to a dividing point is assumed to be a corresponding point in the present embodiment, a corresponding point is not limited to this, and the edge with the greatest absolute value of the extremum of a concentration gradient on a search line may be used as a corresponding point. If an edge is detected in S1150, one is added to the value of frame data $N_{D1}$ of a corresponding line segment.

S1160, S1170

In S1160, the information processing apparatus 1 increases j by 1, and the processing proceeds to S1170. If a process has ended with respect to all the dividing points DPj, the result of S1170 is YES, and the edge detection process ends. If the process has not ended with respect to all the dividing points, the result of S1170 is NO, and the processing returns to a process in S1140.

Next, an example of the position and orientation calculation process in S1040 in FIG. 4 is described in detail. In a position and orientation calculation process, after edge detection has ended, by performing a non-linear-optimization calculation, predicted values of the position and orientation of an image capture device in relation to an object (hereinafter, referred to as s) are corrected through an iterative operation. Thereby, the position and orientation of an image capture device are calculated.

Figure 9:
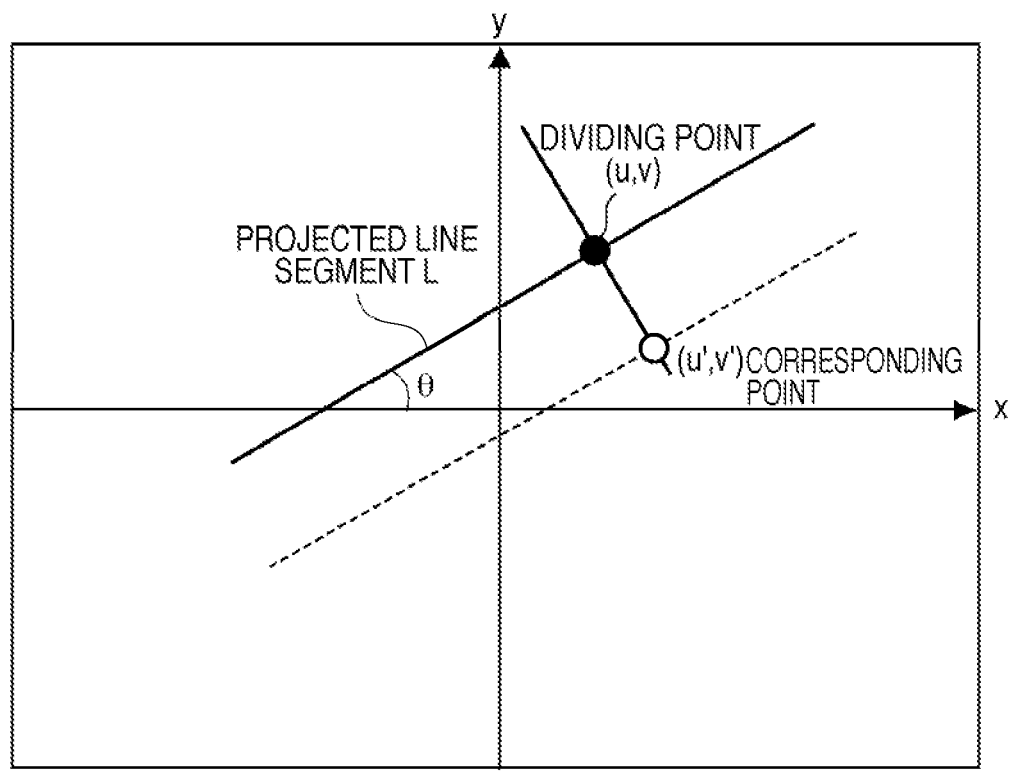
FIG. 9 is a diagram showing a schematic example of a process for calculating the position and orientation of an image capture device 100 using information on an edge.

Here, among the dividing points DPj described above, the total number of dividing points that are not concealed, and for which corresponding points are obtained through the edge detection process in S1030 is $N_{D1}$. FIG. 9 is a diagram showing a schematic example of a process for calculating the position and orientation of the image capture device 100 using information on an edge. In this case, the horizontal direction and perpendicular direction of the image are set to be an x-axis and a y-axis, respectively.

Projected image coordinates of a certain dividing point are indicated as $(u_0, v_0)$, and the inclination of a line segment L to which the dividing point belongs on the image is indicated as inclination $\theta$ relative to the x-axis. The inclination $\theta$ is calculated as the inclination of a straight line obtained by the three-dimensional coordinates of both ends of a line segment being projected onto the image based on s (predicted values), and the coordinates of the both ends being connected on the image. The normal vector of the line segment L on the image is $(\sin \theta, -\cos \theta)$. Further, the image coordinates of the corresponding point of a dividing point are (u', v').

Here, the point (x, y) on the straight line that passes through the point (u, v) and whose inclination is $\theta$ can be indicated by $$x \sin \theta - y \cos \theta = u \sin \theta - v \cos \theta \qquad \text{[Expression 1]}$$

(u, v, and $\theta$ are constants).

The coordinates of a projected dividing point on an image change due to the position and orientation of the image capture device 100. Further, there are six degrees of freedom for the position and orientation of the image capture device 100. In other words, s is a six-dimensional vector and consists of three elements indicating the position of the image capture device 100, and three elements indicating the orientation thereof. Three elements indicating the orientation are expressed by an expression using Euler angles, a three-dimensional vector whose direction indicates a rotation axis and whose magnitude indicates a rotation angle, and the like, for example. The image coordinates of the dividing point (u, v) can be approximated as shown by "Expression 3" through a primary Tayler expansion in the vicinity of $(u_0, v_0)$.

$$u \approx u_0 + \sum_{i=1}^{6} \frac{\partial u}{\partial s_i}\Delta s_i, \ v \approx v_0 + \sum_{i=1}^{6} \frac{\partial v}{\partial s_i}\Delta s_i \quad \text{[Expression 2]}$$

"Expression 3" can be acquired by substituting an approximate expression shown by "Expression 2" into Expression 1.

$$x\sin\theta - y\cos\theta = \quad \text{[Expression 3]}$$
$$\left(u_0 + \sum_{i=1}^{6}\frac{\partial u}{\partial s_j}\Delta s_j\right)\sin\theta - \left(v_0 + \sum_{j=1}^{6}\frac{\partial v}{\partial s_i}\Delta s_i\right)\cos\theta$$

Here, a correction value Δs for the position and orientation of the image capture device 100 is calculated such that the straight line shown by "Expression 3" passes through the image coordinates (u', v') of the corresponding point of the dividing point.

Assuming that $r = u_0\sin\theta - v_0\cos\theta$(constant), and [Expression 4]
$d = u'\sin\theta - v'\cos\theta$(constant),
$$\sin\theta \sum_{i=1}^{6}\frac{\partial u}{\partial s_i}\Delta s_i - \cos\theta \sum_{j=1}^{6}\frac{\partial v}{\partial s_i}\Delta s_i = d - r$$

can be acquired. Since "Expression 4" holds for $N_{D1}$ dividing points, the linear simultaneous equations for Δs as shown by "Expression 5" hold true.

$$\begin{bmatrix} \sin\theta_1\frac{\partial u_1}{\partial s_1} - \cos\theta_1\frac{\partial v_1}{\partial s_1} & \sin\theta_1\frac{\partial u_1}{\partial s_2} - \cos\theta_1\frac{\partial v_1}{\partial s_2} & \cdots & \sin\theta_1\frac{\partial u_1}{\partial s_6} - \cos\theta_1\frac{\partial v_1}{\partial s_6} \\ \sin\theta_2\frac{\partial u_2}{\partial s_1} - \cos\theta_1\frac{\partial v_2}{\partial s_1} & \sin\theta_2\frac{\partial u_2}{\partial s_2} - \cos\theta_1\frac{\partial v_2}{\partial s_2} & \cdots & \sin\theta_2\frac{\partial u_2}{\partial s_6} - \cos\theta_1\frac{\partial v_2}{\partial s_6} \\ \vdots & \vdots & \ddots & \vdots \\ \sin\theta_{N_{D1}}\frac{\partial u_{N_{D1}}}{\partial s_1} - \cos\theta_{N_{D1}}\frac{\partial v_{N_{D1}}}{\partial s_1} & \sin\theta_{N_{D1}}\frac{\partial u_{N_{D1}}}{\partial s_2} - \cos\theta_{N_{D1}}\frac{\partial v_{N_{D1}}}{\partial s_2} & \cdots & \sin\theta_{N_{D1}}\frac{\partial u_{N_{D1}}}{\partial s_6} - \cos\theta_{N_{D1}}\frac{\partial v_{N_{D1}}}{\partial s_6} \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \quad \text{[Expression 5]}$$

$$\begin{bmatrix} d_1 - r_1 \\ d_2 - r_2 \\ \vdots \\ d_{N_{D1}} - r_{N_{D1}} \end{bmatrix}$$

Here, "Expression 5" is indicated in a simple manner as shown by "Expression 6".

$$J\Delta s = E \quad \text{[Expression 6]}$$

Δs can be obtained by the Gauss-Newton method or the like based on "Expression 6" using generalization inverse-matrix $(J^T \cdot J)^{-1} \cdot J^T$ of matrix J. However, since edge detection includes much incorrect detection, a robust estimating method as described below is used. Generally, on a dividing point corresponding to an edge incorrectly detected, the error d−r is large. Therefore, its contribution to the simultaneous equations shown by "Expression 5" and "Expression 6" will be great, and the accuracy of Δs acquired as a result will decrease. In view of this, less weight is assigned to data of a dividing point with a large error d−r, and greater weight is assigned to data of a dividing point with a small error d−r. Weight is assigned using the Tukey function as shown by "Expression 7", for example.

$$w(d-r) = \begin{cases} (1 - ((d-r)/c)^2)^2 & |d-r| \le c \\ 0 & |d-r| > c \end{cases} \quad \text{[Expression 7]}$$

c is a constant. Note that the function for assigning weight does not need to be the Tukey function, and may be the Huber function as shown by "Expression 8" or the like, for example. In other words, the function is not particularly limited as long as it is a function with which less weight is assigned to a dividing point with a large error d−r, and greater weight is assigned to a dividing point with a small error d−r.

$$w(d-r) = \begin{cases} 1 & |d-r| \le k \\ k/|d-r| & |d-r| > k \end{cases} \quad \text{[Expression 8]}$$

Weight corresponding to a dividing point DPi is assumed to be $w_i$. Here, a weight matrix W is defined as shown by "Expression 9".

$$W = \begin{bmatrix} w_1 & & & 0 \\ & w_2 & & \\ & & \ddots & \\ 0 & & & w_{N_c} \end{bmatrix} \quad \text{[Expression 9]}$$

The weight matrix W is an $N_c \times N_c$ square matrix, all the components of which are 0 except the diagonal components, and weight $w_i$ is assigned to the diagonal components. "Expression 6" is transformed so as to be "Expression 10" using this weight matrix W.

$$WJ\Delta s = WE \quad \text{[Expression 10]}$$

A correction value Δs is obtained by solving "Expression 10" as shown by "Expression 11".

$$\Delta s = (J^T W J)^{-1} J^T W E \quad \text{[Expression 11]}$$

The position and orientation of the image capture device 100 are updated using Δs acquired thereby. Next, it is determined whether or not the iterative operation for the position and orientation of the image capture device 100 converges. In a case in which a correction value Δs is sufficiently small, the total error d−r is sufficiently small, or the total error d−r does not change, for instance, it is determined that calculation of the position and orientation of the image capture device 100 converges. If it is determined that the operation does not converge, using the position and orientation of the image capture device 100 that have been updated, the partial differential of the inclination of a line segment θ, r, and d, and u and v is recalculated for $N_c$ points, and a correction value As is again obtained by solving "Expression 11". Note that here, the Gauss-Newton method is used as a non-linear-optimization technique. However, the non-linear-optimization technique is not limited to this, other non-linear-optimization techniques, such as the Newton-Raphson method, the Levenberg-Marquardt method, a steepest descent method, or a conjugate gradient method, may be used. The above is a description about a method for calculating the position and orientation of the image capture device in S1040.

Figure 10:
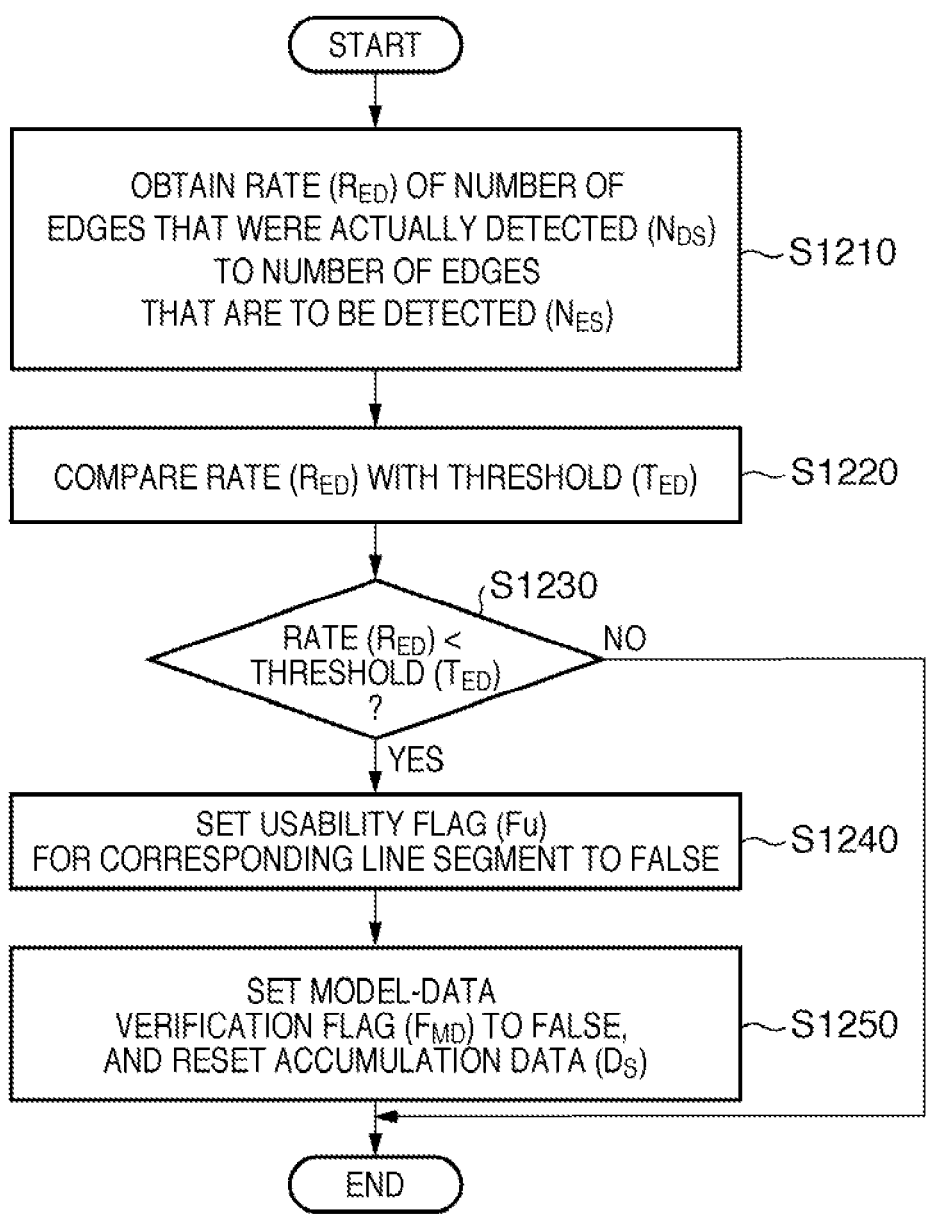
FIG. 10 is a flowchart showing an example of the flow of a model-data verification process in S1090 in FIG. 4.

Next, an example of the flow of the model-data verification process in S1090 in FIG. 4 is described with reference to FIG. 10.

S1210

In S1210, the information processing apparatus 1 verifies model data based on the "total number of edges that are to be detected $N_{ES}$", and the "total number of edges that were actually detected $N_{DS}$". Specifically, a rate $R_{ED}$ of $N_{DS}$ to $N_{ES}$ is calculated.

S1220, S1230

In S1220, the information processing apparatus 1 compares the rate $R_{ED}$ calculated in S1210 with a threshold $T_{ED}$. If $R_{ED}$ is not less than the threshold $T_{ED}$ as a result of the comparison, the result of S1230 is NO, and this process ends. On the other hand, if $R_{ED}$ is less than the threshold $T_{ED}$, the result of S1230 is YES, and the processing proceeds to a process in S1240.

S1240

In S1240, assuming that the detection rate of the line segment is low, the information processing apparatus 1 sets a usability flag $F_u$ for a corresponding line segment to FALSE. Thereby, that line segment is not used for a position and orientation calculation process thereafter. For example, in the model data shown in FIG. 3A, if an edge corresponding to L14 is not detected due to lighting conditions and the like, a flag $F_u$ for L14 is set to FALSE, which prevents L14 from being used for a position and orientation calculation process.

S1250

In S1250, the information processing apparatus 1 sets the model-data verification flag $F_{MD}$ to FALSE, resets all pieces of accumulation data $D_S$ to 0, and ends this process.

As described above, according to Embodiment 1, for each line segment, the rate of the "number of edges that were actually detected" to the "number of edges that are to be detected" is calculated, and it is determined whether or not to use the line segment to which that edge belongs for position and orientation calculation based on that rate. Thereby, it is possible to prevent a line segment that is not actually detected from being used for position and orientation calculation. Thereby, measurement of a three-dimensional model can be simplified, and a decrease in the accuracy and stability of alignment can be suppressed.

Note that in the description given above, although it is determined whether or not to use a corresponding line segment for position and orientation calculation based on the rate of dividing points for which edges (corresponding points) could not be detected, determination may be made based on information other than the rate of dividing points for which edges could not be detected. For example, the same line segment may be detected from a plurality of images, and based on the rate at which that line segment could not be detected, it may be determined whether or not to use that line segment for position and orientation calculation.

Embodiment 2

In Embodiment 1 described above, the rate of the "number of edges that were actually detected" to the "number of edges that are to be detected" is calculated, and it is determined, for each line segment, whether or not to use the line segment for position and orientation calculation based on that rate. In contrast, in Embodiment 2, a description is given regarding a case in which it is determined, for each line segment, whether or not to use the line segment for position and orientation calculation based on the error at the time of performing position and orientation calculation. Note that since the configuration in Embodiment 2 is similar to those shown in FIG. 1 and FIG. 2 illustrating Embodiment 1, a description thereof is omitted and the description of different points is emphasized here.

First, model-data verification data according to Embodiment 2 is described. Here, similar to Embodiment 1, model-data verification data is stored in the model-data storage unit 130, and the model-data verification data is constituted so as to include frame data $D_1$ and accumulation data $D_S$. Further, $D_1$ and $D_S$ included in model-data verification data are stored corresponding to each of the line segments that constitute model data.

Frame data $D_1$ stores therein one frame of verification data, and is constituted from the "number of edges that are to be detected $N_{E1}$", and the "number of edges that were used as effectual information in position and orientation calculation $N_{C1}$". Further, accumulation data $D_S$ is constituted from the "number of pieces of accumulation data $N_S$", the "total number of edges that are to be detected $N_{ES}$", and the "number of edges that were used as effectual information in position and orientation calculation $N_{CS}$". $N_{ES}$ is the total of $N_{E1}$ for $N_{max}$ frames, and $N_{CS}$ is the total of $N_{C1}$ for $N_{max}$ frames. In other words, Embodiment 2 differs from Embodiment 1 in that not the "number of edges that were actually detected", but the "number of edges that were used as effectual information in position and orientation calculation" is held as accumulation data.

An example of the flow of processing performed by the information processing apparatus 1 according to Embodiment 2 is described with reference to FIG. 11.

S2010

In S2010, the information processing apparatus 1 performs initialization processing. In initialization processing, predicted values of the position and orientation of the image capture device 100 in a reference coordinate system are set, and a model-data verification flag, a usability flag, and accumulation data are reset. Note that since setting of predicted values of the position and orientation of the image capture device 100, and reset of a model-data verification flag and a usability flag are performed through the same process as that in S1010, a description thereof is omitted. In Embodiment 2, all of the "number of pieces of accumulation data $N_a$", the "total number of edges that are to be detected $N_{ES}$", and the "number of edges that were used as effectual information in position and orientation calculation $N_{CS}$" are set to 0, and accumulation data $D_S$ is reset.

S2015

In S2015, it is determined whether position and orientation measurement has ended. If the user inputs an instruction to end via the input unit, such as a mouse or a keyboard, the result of S2015 is YES, and this process ends. In other cases, the result of S2015 is NO, and the processing proceeds to a process in S2020.

S2020

In S2020, in the image acquisition unit 110, the information processing apparatus 1 takes an image captured by the image capture device 100 in the apparatus (inside the information processing apparatus 1).

S2030

In S2030, in the image feature detection unit 120, the information processing apparatus 1 detects edges on the image inputted in S2020. When starting this process, frame data $N_{E1}$ and $N_{C1}$ for every line segment are set to 0. Note that since an edge detection process is a similar process to that shown in FIG. 5 and described in Embodiment 1, a detailed description thereof is omitted. The point that differs from Embodiment 1 is that only $N_{E1}$ is updated in S2030, compared with $N_{E1}$ and $N_{D1}$ constituting the frame data being updated in Embodiment 1.

S2040

In S2040, in the position orientation calculation unit 140, the information processing apparatus 1 calculates the position and orientation of the image capture device 100. Note that since a position and orientation calculation process is a similar process to that in Embodiment 1, a detailed description thereof is omitted. The point that differs from Embodiment 1 is that after the position and orientation calculation process described in S1030 has ended, frame data $N_{C1}$ is updated in S2030 based on the weight matrix W (see Expression 9) acquired through that calculating process. The weight matrix W is defined by the weight corresponding to each dividing point, and this weight is greater, the smaller the value of the error d–r is. In view of this, an edge whose weight is less than a constant value is assumed to be incorrectly detected or correspond incorrectly and, thus, considering that information on the edge whose weight has a constant value or more was effectually used, one is added to the value of frame data $N_{C1}$ of the line segment to which a corresponding dividing point belongs.

S2050

In S2050, in the model-data verification unit 150, the information processing apparatus 1 determines whether or not the verification mode has been entered. This determination is made based on the value of the model-data verification flag $F_{MD}$. If model data is verified ($F_{MD}$=TRUE), the processing proceeds to a process in S2060, and if verification is not to be performed, the processing returns to a process in S2015.

S2060

In S2060, the information processing apparatus 1 starts a model-data verification process. In this process, first, for each line segment that constitutes three-dimensional model data stored in the model-data storage unit 130, the accumulation data $N_{ES}$ and $N_{CS}$ thereof are updated. In other words, the frame data $N_{E1}$ and $N_{C1}$ of each line segment updated through the processes in S2030 and S2040 are added to $N_{ES}$ and $N_{CS}$, respectively.

S2070

In S2070, the information processing apparatus 1 increases the number of pieces of accumulation data $N_S$ by one (accumulation data count ++).

S2080

In S2080, the information processing apparatus 1 determines whether or not the number of pieces of accumulation data $N_S$ is equal to the number of pieces of accumulation data $N_{max}$ set in advance. If the numbers are equal, the processing proceeds to a process in S2090, and if the numbers are not equal, the processing returns to a process in S2015, and the next image, or in other words, the image of the next frame, is acquired through a process in S2020.

S2090

In S2090, in the model-data verification unit 150, the information processing apparatus 1 verifies, for each of the line segments that constitute three-dimensional model data, whether or not to use the line segment for position and orientation calculation. Note that although the details about this process are described later, in Embodiment 2, model data stored in the model-data storage unit 130 is verified based on accumulation data $N_{ES}$ and $N_{CS}$ for every line segment. After this process ends, the processing returns to a process in S2015.

Figure 11:
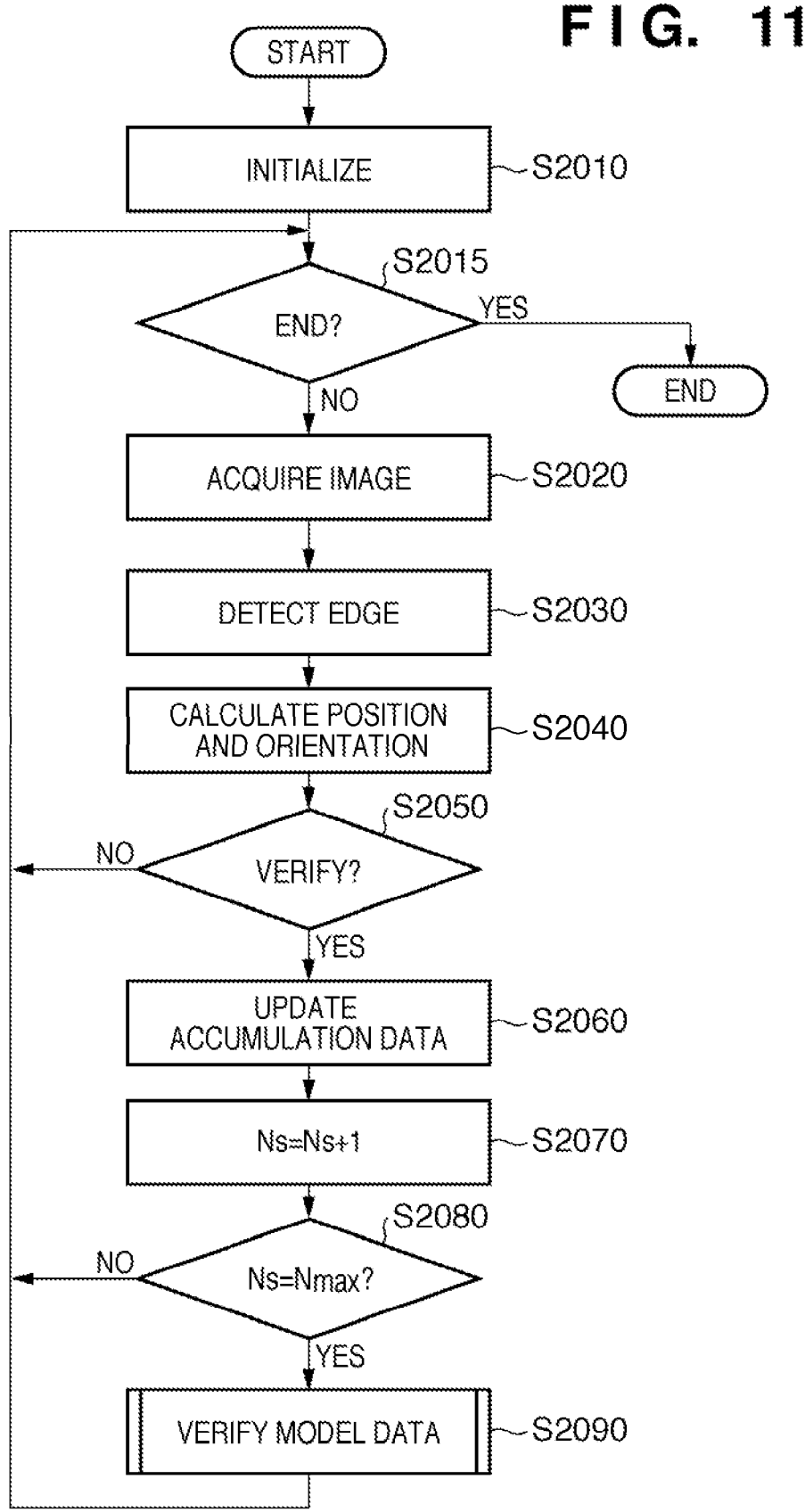
FIG. 11 is a flowchart showing an example of the flow of processing performed by the information processing apparatus 1 according to Embodiment 2.
Figure 12:
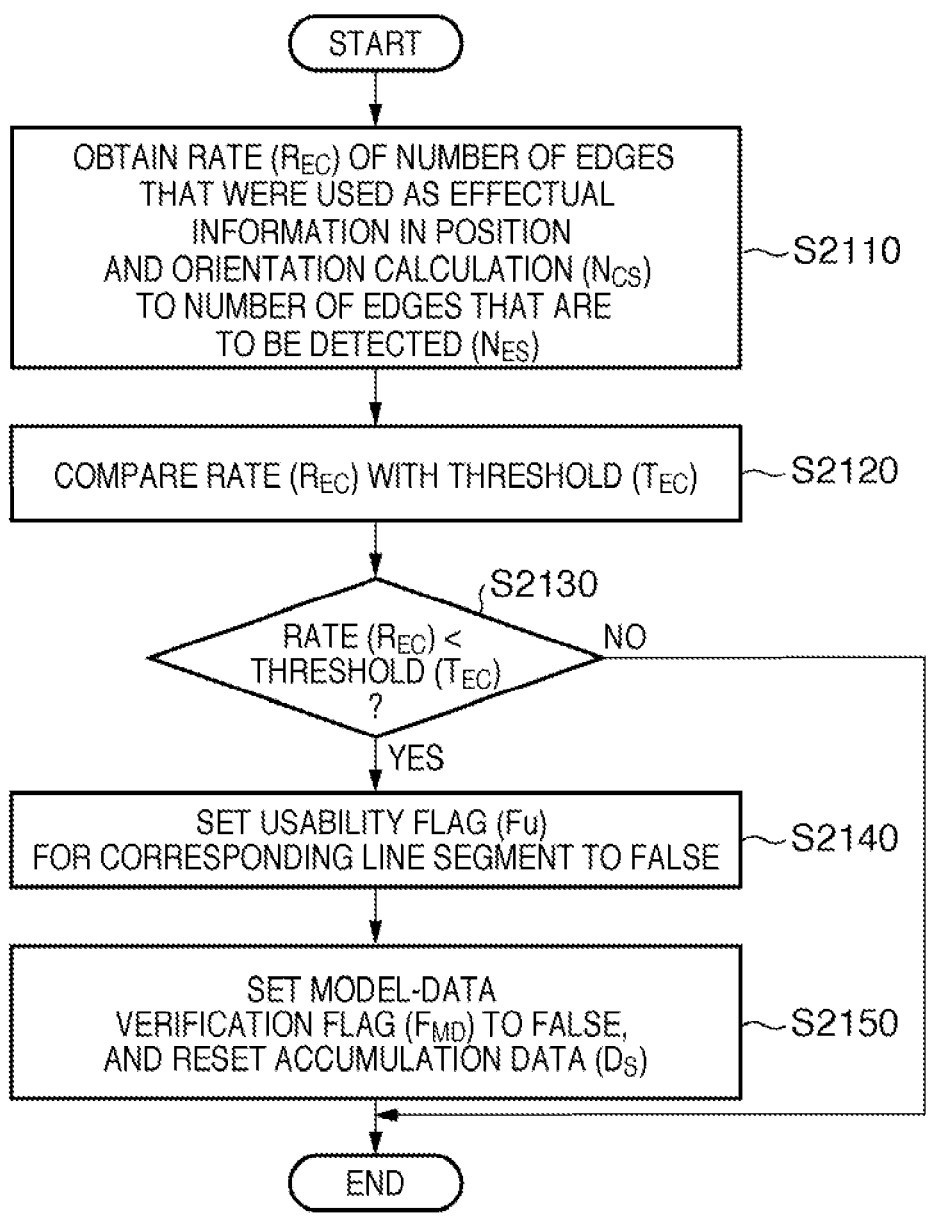
FIG. 12 is a flowchart showing an example of the flow of a model-data verification process in S2090 in FIG. 11.

Next, an example of the flow of a model-data verification process in S2090 in FIG. 11 is described with reference to FIG. 12.

S2110

In S2110, the information processing apparatus 1 verifies model data based on the "total number of edges that are to be detected $N_{ES}$", and the "number of edges that were used as effectual information in position and orientation calculation $N_{CS}$". Specifically, a rate $R_{EC}$ of $N_{CS}$ to $N_{ES}$ is calculated.

S2120, S2130

In S2120, the information processing apparatus 1 compares the rate $R_{EC}$ calculated in S2110 with a threshold $T_{EC}$. If $R_{EC}$ is not less than the threshold $T_{EC}$ as a result of the comparison, the result of S2130 is NO, and this process ends. On the other hand, if $R_{EC}$ is less than the threshold $T_{EC}$, the result of S2130 is YES, and the processing proceeds to a process in S2140.

S2140

In S2140, the information processing apparatus 1 sets a usability flag $F_u$ for a corresponding line segment to FALSE, assuming that the possibility of incorrect detection or incorrect correspondence is high. Thereby, that line segment is not used for a position and orientation calculation process thereafter.

S2150

In S2150, the information processing apparatus 1 sets the model-data verification flag $F_{MD}$ to FALSE, resets all pieces of accumulation data $D_S$ to 0, and ends this process.

As described above, according to Embodiment 2, for each line segment, based on the weight value decided by the magnitude of the error when performing position and orientation calculation, it is determined whether or not to use the line segment for position and orientation calculation. Thereby, it is possible to prevent a line segment that is often incorrectly detected or corresponds incorrectly from being used for position and orientation calculation.

Embodiment 3

In Embodiments 1 and 2 described above, the case in which the information processing apparatus 1 according to one embodiment of the present invention is applied to alignment in AR is described. In contrast, in Embodiment 3, a description is given using a case in which the information processing apparatus 1 is applied to the measurement of segment data using images, and the measurement of segment data suitable for alignment using an edge is performed.

Figure 13:
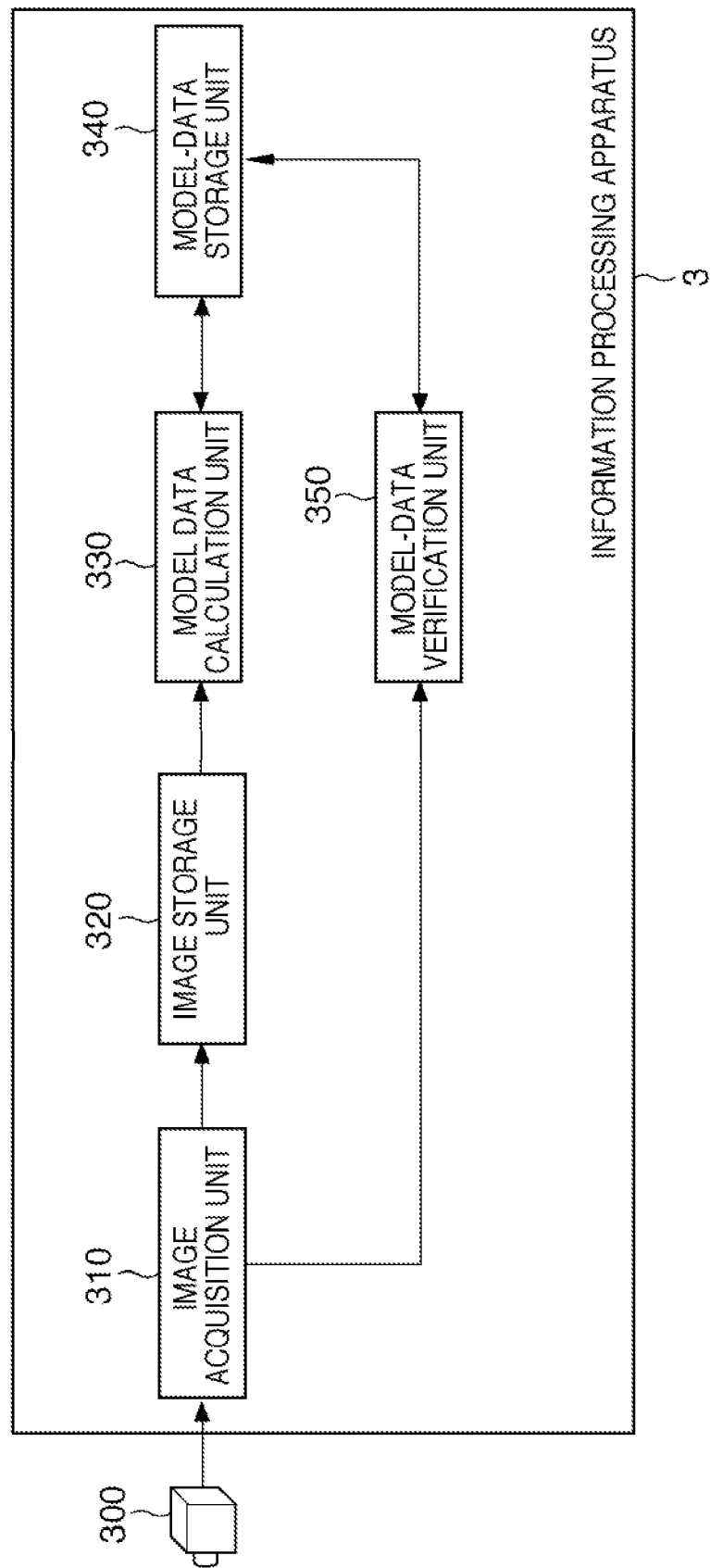
FIG. 13 is a diagram showing an example of the configuration of an information processing apparatus 3 according to Embodiment 3.

FIG. 13 is a diagram showing an example of the configuration of an information processing apparatus 3 according to Embodiment 3.

The information processing apparatus 3 is constituted, with an image acquisition unit 310, an image storage unit 320, a model data calculation unit 330, a model-data storage unit 340, and a model-data verification unit 350 being provided. The information processing apparatus 3 calculates a three-dimensional model of a line segment based on a plurality of images of real space or a real object captured by an image capture device 300.

The image acquisition unit 310 inputs an image captured by the image capture device 300 into the information processing apparatus 3. The image acquisition unit 310 fulfills a function equivalent to that of the image acquisition unit 110 shown in FIG. 2 illustrating Embodiment 1.

The image storage unit 320 stores an image inputted from the image acquisition unit 310. Note that an image is stored by the image storage unit 320 based on an instruction from the user via the input unit.

The model data calculation unit 330 calculates a three-dimensional model of a line segment using a plurality of images stored in the image storage unit 320. In Embodiment 3, a three-dimensional model of a line segment is calculated using the method disclosed in Document 5 described above.

The model-data storage unit 340 stores the three-dimensional model of the line segment calculated by the model data calculation unit 330.

The model-data verification unit 350 verifies the three-dimensional model of the line segment stored in the model-data storage unit 340 by performing position and orientation calculation based on the image inputted from the image acquisition unit 310.

Figure 14:
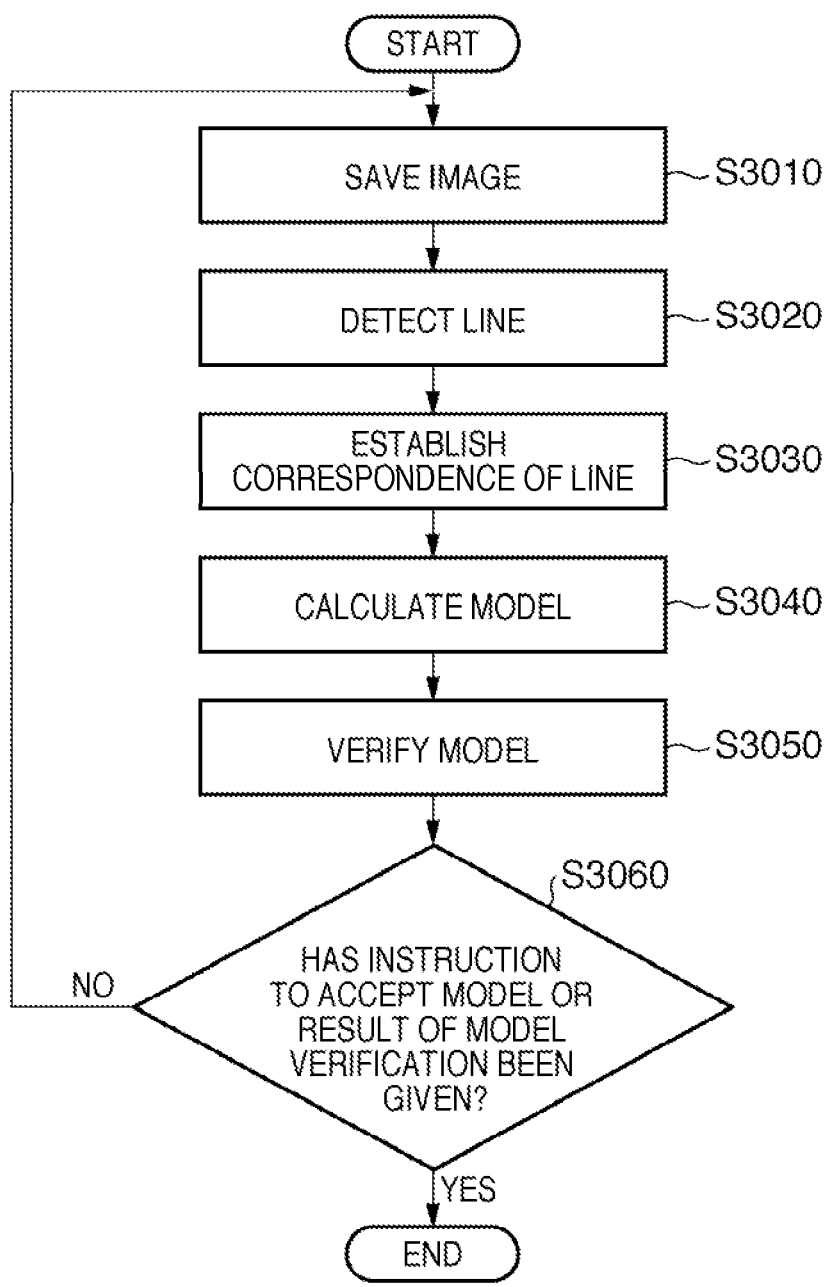
FIG. 14 is a flowchart showing an example of the flow of processing performed by the information processing apparatus 3 according to Embodiment 3.

Next, an example of the flow of processing performed by the information processing apparatus 3 according to Embodiment 3 is described with reference to FIG. 14.

S3010

In S3010, in the image storage unit 320, the information processing apparatus 3 saves images necessary for calculation of a three-dimensional model of a line segment. Since it is described in Document 5 that "six correspondences between three images are necessary to reconstruct a three-dimensional model of a line segment", at least three or more images are saved in S3010. Images are saved by, for example, the user inputting an image saving command via the input unit, such as a keyboard or a mouse, while freely moving the image capture device 300. If the image saving command is inputted, at the time of the command being inputted, an image inputted from the image acquisition unit 310 is saved in the image storage unit 320. Note that although images are saved in response to user input here, images may be automatically saved based on a screen change.

S3020

In S3020, the information processing apparatus 3 detects a line from the image stored in S3010. A line is detected based on an instruction from the user.

Specifically, detection is manually performed by the user designating the starting point and the terminal point of a line on an image. Note that a method for detecting a line is not limited to this, and it is sufficient if the method enables detection of a line on an image. For example, after implementing edge detection using the method described in Document 7, a line on an image may be detected using the Hough transformation.

S3030

In S3030, the information processing apparatus 3 establishes the correspondence of lines detected in S3020 between images. This establishment of correspondence is performed based on an instruction from the user. In other words, the user manually performs this operation. Note that a method for establishing the correspondence of lines is not limited to this, and for example, correspondence between similar lines may be automatically established using information on pixels around the lines.

S3040

In S3040, in the model data calculation unit 330, the information processing apparatus 3 calculates a three-dimensional model of a line segment (line) based on information on the line for which correspondence is established in S3030. Then, the information processing apparatus 3 calculates the three-dimensional position of an end point from the calculated three-dimensional model of the line segment, and the position of the end point on an image, and stores the calculated position in the model-data storage unit 340 as a three-dimensional model of a line segment, in the manners shown in FIGS. 3B to 3D. Note that the three-dimensional model of a line segment is assumed to be indicated by a direction vector and a passing position of a straight line in three-dimensional space. Calculation of a three-dimensional model of a line segment is performed using the method disclosed in Document 5 described above, for example. The method for calculating a three-dimensional model of a line segment is not limited to this, and it is sufficient to use a method for calculating from the correspondence of lines between images.

Here, the outline of a method for calculating a three-dimensional model of a line segment disclosed in Document 5 is briefly described. (1) An initial value is randomly provided to the orientation of an image capture device when capturing each image. (2) A direction vector of a line is calculated based on the constraint that an equation of the line on an image, a direction vector of the line in three-dimensional space, and the orientation of the image capture device are satisfied. (3) The passing position of the line, and the position of the image capture device are calculated based on the constraint that the equation of the line on the image, the passing position of the line, and the position of the image capture device are satisfied. (4) An unknown parameter acquired through (1), (2), and (3) is optimized. (5) The accuracy of the unknown parameter acquired in (4) is evaluated, and if the parameter is inaccurate, the processing returns to (1). If the parameter is accurate, the processing ends.

S3050

In S3050, in the model-data verification unit 350, the information processing apparatus 3 verifies the three-dimensional model of the line segment calculated in S3040. Specifically, based on an image inputted from the image acquisition unit 310, and a three-dimensional model stored in the model-data storage unit 340, each line segment that constitutes model data is evaluated using a method described in Embodiment 1 or Embodiment 2. Then, a line segment that has been actually detected a smaller number of times relative to the number of times that the line segment is to be detected, and a line segment that has been used as effectual information a smaller number of times are deleted from the model data. Thereby, a three-dimensional model stored in the model-data storage unit 340 is updated.

S3060

In S3060, the information processing apparatus 3 presents the result of three-dimensional model calculation in S3040, or the result of model verification in S3050 to the user by displaying the results, for example. Thereby, the user determines whether or not to accept the result of three-dimensional model calculation, or the result of model verification. If the user accepts the result, the user's decision is inputted into the information processing apparatus 3, the result of S3060 is YES, and this processing ends. If the user does not accept the result, the user's decision is inputted into the information processing apparatus 3, the result of S3060 is NO, and the processing returns to a process in S3010.

As described above, according to Embodiment 3, also in the case of evaluating the measurement result for segment data using images, model data suitable for alignment using an edge can be measured.

Although the above embodiments are examples of typical embodiments of the present invention, the present invention is not limited to the embodiments described above and shown in the drawings, and can be modified as appropriate within the range where the essential points thereof are not modified, and implemented.

Modified Embodiment 1

In the description given above, two patterns of descriptions regarding a determination being made as to whether or not to use each line segment for position and orientation calculation were given using Embodiments 1 and 2. There is no need to always independently implement these two patterns of processes, and the processes may be implemented using the two determination methods together. In other words, the present invention can be implemented using at least one of the determination processes.

For example, as frame data, for every line segment of each frame, three pieces of information consisting of the "number of edges that are to be detected $N_{E1}$", the "number of edges that were used as effectual information in position and orientation calculation $N_{C1}$", and the "number of edges that were actually detected $N_{D1}$" are acquired. Then, as accumulation data, for every line segment, three numbers consisting of the "total number of edges that are to be detected $N_{ES}$", the "number of edges that were used as effectual information in position and orientation calculation $N_{CS}$", and the "total number of edges that were actually detected $N_{DS}$" are accumulated. Note that $N_{ES}$, $N_{CS}$, and $N_{DS}$ are the sum of frame data $N_{E1}$, $N_{C1}$, and $N_{D1}$ for $N_{max}$ frames. Based on this accumulation data $N_{ES}$, $N_{CS}$, and $N_{DS}$, it is determined whether or not to use a line segment for position and orientation calculation. For example, determination is made using both of the rates $R_{ED}$ and $R_{EC}$ of $N_{DS}$ and $N_{CS}$ to $N_{ES}$. In other words, the thresholds $T_{ED}$ and $T_{EC}$ are provided for $R_{ED}$ and $R_{EC}$, respectively, and if both $R_{ED}$ and $R_{EC}$ are less than the thresholds $T_{ED}$ and $T_{EC}$, it is determined that the detection rate of a corresponding line segment is low, and the possibility of the line segment being incorrectly detected or corresponding incorrectly is high. Then, a Flag $F_u$ used for position and orientation calculation is set to FALSE, which prevents that line segment from being used for position and orientation calculation henceforth. Further, if $R_{ED}$ and $R_{EC}$ are not less than the thresholds $T_{ED}$ and $T_{EC}$ at the same time, and either one of the rates is less than the threshold, it may be determined that that line segment is not to be used for position and orientation calculation. Furthermore, the rate of $(N_{DS}+N_{CS})$ to $N_{ES}$ may be used.

Modified Embodiment 2

In the description given above, model data is verified using user input as a trigger. However, model data may not be verified using user input as a trigger, but may be automatically verified.

For example, the model-data verification flag $F_{MD}$ may be set to TRUE for a certain period of time after position and orientation measurement starts, and model data may be automatically verified. Further, if the accuracy of position and orientation calculation decreases (if total error is large), the model-data verification flag $F_{MD}$ may be automatically set to TRUE, and model data may be automatically verified. In this case, after usability flags $F_u$ corresponding to all the line segments are set to TRUE once, model data is verified. Thereby, the present invention can also be applied to a case in which past verification was incorrect, or a case in which lighting conditions or the like change.

Modified Embodiment 3

In the description given above, although the information processing apparatus automatically determines whether or not to use a line segment for position and orientation calculation, based on the threshold T, the determination may be made by the user.

For example, in Embodiments 1 and 2, when drawing a three-dimensional model of a line segment, line segments are presented to the user using a method for displaying the line segment that is used for position and orientation calculation and the line segment that is not used therefor differently, such as by changing the color and thickness thereof. The user determines whether or not to approve a determination result, referring to the presented three-dimensional model of the line segment. Approval by the user is performed via the input unit, such as a mouse or a keyboard, for example.

Further, for example, in Embodiment 3, based on the calculated three-dimensional model of a line segment, and the position and orientation of the image capture device when capturing each image, a three-dimensional model of the line segment is drawn on each image. At this time, line segments are presented to the user using a method for displaying the line segment that is used for position and orientation calculation and the line segment that is not used therefor differently, such as by changing the color and thickness thereof. The user determines whether or not to approve a determination result based on that presentation result.

Modified Embodiment 4

In the description given above, although a determination is made, for each of the line segments that constitute three-dimensional model data, as to whether or not to use a line segment for position and orientation calculation, this determination is not necessarily limited on a line segment basis.

For example, it may be determined whether or not to use a set of a plurality of line segments as one basis for position and orientation calculation. On the contrary, one line segment may be divided into a plurality of line segments, and a determination may be made, for every divided line segment, whether or not to use the divided line segment for position and orientation calculation. In Document 5 described above, a method for calculating a three-dimensional model of a straight line having an infinite length is described. The three-dimensional coordinates of an end point are calculated from the position of the end point designated on an image, and the three-dimensional model of the straight line. However, if a straight line is divided into a plurality of line segments, and determination may be made, for every line segment, whether or not to use the line segment for position and orientation calculation, since only the line segment that actually exists is used, a process for calculating the coordinates of the end point is unnecessary.

Modified Embodiment 5

In the description given above, by setting a flag indicating whether or not to perform verification (model-data verification flag), a three-dimensional model of a line segment is explicitly verified. However, verification is not explicitly performed, and model verification may be always performed while performing the position and orientation calculation.

For example, the position and orientation calculation is performed using a line segment used for position and orientation calculation, a model projection is implemented based on that result of calculation, and edge detection is performed in the vicinity of a dividing point of each projected line segment. At this time, all the line segments in the model data are to be projected. The number of times that an edge should be detected, and the actual number of times that the edge has been detected is stored as accumulation data, when $N_{max}$ frames of data are accumulated, it is determined whether or not to use a line segment for position and orientation calculation. Then, after the determination ends, accumulation data is cleared, $N_{max}$ frames of data are stored again, and the determination of whether or not to use a line segment for position and orientation calculation is repeated. Thereby, even in a case in which lighting conditions or the position and orientation of the image capture device greatly change, a line segment suitable for each case can be used. Note that since the calculation load of edge detection is great, there is no need to store accumulation data for every frame, and accumulation data may be stored for every several frames.

Modified Embodiment 6

In the description given above, the case in which a line segment projected on an image is equally divided, and a corresponding edge is detected on a search line that passes through a dividing point and is perpendicular to the projected line segment is described as an example. However, the method for detecting an edge is not limited to this, and it is sufficient to use a method for detecting a corresponding edge on the basis of the line segment projected on the image.

For example, using information on the image around the edge, a corresponding edge may be detected. Further, as disclosed in Document 8 described above, after detecting a plurality of edges on a search line using the method described above, a corresponding edge may be decided using information on the image around the edge. Further, without dividing a projected line segment, a one-dimensional search may be performed in the normal direction of a line segment. The above is a description about modified embodiments.

Note that the present invention can also adopt an embodiment, for example, as a system, an apparatus, a method, a program, a computer-readable storage medium, or the like. Specifically, the present invention may be applied to a system constituted from a plurality of devices, and may also be applied to an apparatus constituted from one device.

According to the present invention, the calculation load using three-dimensional information while performing a position and orientation calculation process can be reduced and, also, a decrease in the accuracy or stability of alignment can be suppressed.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-308996, filed Dec. 3, 2008, which is hereby incorporated by reference herein in its entirety.

What is claimed is:

1. An information processing apparatus comprising:
an acquisition unit configured to acquire an image including a target object captured by an image capture device;
an obtaining unit configured to obtain a position and orientation of the image capture device;
a holding unit configured to hold three-dimensional information of the target object, the three-dimensional information comprising a plurality of geometric features;
a detection unit configured to detect image features, from the image acquired by the acquisition unit, corresponding to the held geometric features;
a determination unit configured to make a determination, for the geometric features, whether image features corresponding the geometric features are detected by the detection unit; and
an updating unit configured to update the three-dimensional information, held by the holding unit, based on a determination result of the determination unit, and to store the updated three-dimensional information.

2. The information processing apparatus according to claim 1, wherein the updating unit updates the three-dimensional information by deleting, from the three-dimensional information, a geometric feature for which the determination unit does not determine that a corresponding image feature is detected.

3. The information processing apparatus according to claim 1, further comprising:
a presentation unit configured to present a user a result of the determination made by the determination unit; and
an input unit configured to input whether the user approves based on the result of the determination presented by the presentation unit.

4. The apparatus according to claim 1, wherein the geometric features are corner points.

5. The apparatus according to claim 1, wherein the detection unit detects image features corresponding to the held geometric features by projecting the held geometric features onto the acquired image.

6. The information processing apparatus according to claim 1, wherein the geometric feature is a line segment of the target object,
wherein the determination unit determines whether the detected image features corresponds to dividing points, set by dividing the line segment of the target object, and then determines whether image features corresponding to geometric features are detected based on a detection rate calculated by a sum of a determination result.

7. The information processing apparatus according to claim 6, wherein the determination unit determines that the image features corresponding to the geometric features are detected in case in which the detection rate is larger than a predetermined threshold.

8. The information processing apparatus according to claim 1, wherein the determination unit makes the determination based on a magnitude of an error that indicates a gap between detected geometric features detected by the detection unit and geometric features of line segments included in the three-dimensional information corresponding to the detected geometric feature.

9. The information processing apparatus according to claim 1, wherein the acquisition unit acquires a plurality of images,
the detection unit detects image features from each of the plurality of images corresponding to geometric feature included in the three-dimensional information, and
the determination unit determines makes the determination based on a detection rate of image features detected from each of the plurality of images, which correspond to the geometric features included in the three-dimensional information.

10. The information processing apparatus according to claim 1, wherein the image capture device is comprised in a head-mounted display.

11. The information processing apparatus according to claim 1, wherein the updating unit updates the three-dimensional information by setting a geometric feature, for which the determination unit does not determine that a corresponding image feature is detected, to not be used in a calculation of a position and orientation of the image processing apparatus.

12. The processing method according to claim 1, wherein the updating step of acquiring updates the three-dimensional information by setting a geometric feature, for which the determining step does not determine that a corresponding image feature is detected, to not be used in a calculation of a position and orientation of the image processing method.

13. A processing method comprising:
   an acquisition step of acquiring an image including a target object captured by an image capture device;
   an obtaining step of obtaining a position and orientation of the image capture device;
   a holding step of holding three-dimensional information of the target object, the three-dimensional information comprising a plurality of geometric features;
   a detection step of detecting image features, from the image acquired in the acquisition step, corresponding to the held geometric features;
   a determination step of making a determination, for the geometric features, whether image features corresponding the geometric features are detected in the detection step;
   an updating step of acquiring configured to update the three-dimensional information held by the holding step based on a determination result of the determination step; and
   a storing step of storing the three-dimensional information updated by the updating step.

14. The processing method according to claim 13, further comprising:
   a presentation step of presenting a user a result of the determination made in the determination step; and
   an input step of inputting whether the user approves based on the result of the determination presented in the presentation step.

15. A non-transitory computer-readable storage medium storing a computer program that causes a computer provided in an information processing apparatus, to function as:
   an acquisition unit configured to acquire an image including a target object captured by an image capture device;
   an obtaining unit configured to obtain a position and orientation of the image capture device;
   a holding unit configured to hold three-dimensional information of the target object, the three-dimensional information comprising a plurality of geometric features;
   a detection unit configured to detect image features, from the image acquired by the acquisition unit, corresponding to the held geometric features;
   a determination unit configured to make a determination, for the geometric features, whether image features corresponding the geometric features are detected by the detection unit; and
   an updating unit configured to update the three-dimensional information, held by the holding unit, based on a determination result of the determination unit, and to store the updated three-dimensional information.

16. The non-transitory computer-readable storage medium storing a computer program according to claim 15, that causes a computer provided in an information processing apparatus to further function as:
   a presentation unit configured to present a user a result of the determination made by the determination unit; and
   an input unit configured to input whether the user approves based on the result of the determination presented by the presentation unit.

17. The non-transitory computer-readable storage medium storing a computer program according to claim 15, wherein the updating unit of updates the three-dimensional information by setting a geometric feature, for which the determination unit does not determine that a corresponding image feature is detected, to not be used in a calculation of a position and orientation of the image processing method.

* * * * *